(12) United States Patent
Shimizu

(10) Patent No.: US 7,258,519 B2
(45) Date of Patent: Aug. 21, 2007

(54) MOUNTING BODY FOR ATTACHMENT TO BOLT BODY AND NUT BODY

(75) Inventor: Shohachi Shimizu, Gifu-Pref (JP)

(73) Assignee: Mirai Kogyo Kabushikigaisha, Gifu (JP)

(*) Notice: Subject to any disclaimer, the term of this patent is extended or adjusted under 35 U.S.C. 154(b) by 0 days.

(21) Appl. No.: 10/495,220

(22) PCT Filed: Nov. 15, 2002

(86) PCT No.: PCT/JP02/11983

§ 371 (c)(1),
(2), (4) Date: May 12, 2004

(87) PCT Pub. No.: WO03/042556

PCT Pub. Date: May 22, 2003

(65) Prior Publication Data

US 2005/0002757 A1 Jan. 6, 2005

(30) Foreign Application Priority Data

Nov. 15, 2001 (JP) ............................ 2001-350395

(51) Int. Cl.
*F16B 37/08* (2006.01)
(52) U.S. Cl. ................ 411/433; 411/437; 411/541; 248/62
(58) Field of Classification Search ............... 411/433, 411/437, 539, 541; 248/62
See application file for complete search history.

(56) References Cited

U.S. PATENT DOCUMENTS 2,664,023 A * 12/1953 Mugford ................. 411/433
3,006,231 A * 10/1961 Kahn ..................... 411/435

(Continued)

FOREIGN PATENT DOCUMENTS

JP  50-79860  7/1975

(Continued)

OTHER PUBLICATIONS

Iwao, W., Toshiba Corp., Carrier Control Device, Abstract of JP2209310, 1990.

(Continued)

*Primary Examiner*—Katherine Mitchell
(74) *Attorney, Agent, or Firm*—Hiroe & Associates; Michael L Crapenhoft

(57) ABSTRACT

A mounting body 100 in accordance with the invention is mounted to a bolt body from a side portion of the bolt body. The mounting body 100 is provided with a mounting portion 10 having an engagement portion 20 provided with an engagement projection 21 engaging with an outer thread of the bolt body, an opening portion 70 moving forward the bolt body into the engagement portion 20, and adjacent portions 30 arranged in a leading end side of the engagement portion 20. The mounting body 100 can be mounted to the bolt body by moving forward the bolt body from the opening portion 70 of the mounting portion 10, thereafter plastically deforming the engagement portion 20 so as to make the adjacent portions 30 relatively close to each other, arranging the engagement portion 20 along an outer surface of the bolt body, and maintaining a state in which the engagement projection 21 is engaged with the outer thread of the bolt body.

10 Claims, 30 Drawing Sheets

U.S. PATENT DOCUMENTS

| | | | | |
|---|---|---|---|---|
| 3,815,434 A | * | 6/1974 | Seger | 74/424.79 |
| 4,226,164 A | * | 10/1980 | Carter | 411/433 |
| 4,531,872 A | * | 7/1985 | Warkotsh | 411/433 |
| 4,861,081 A | * | 8/1989 | Satoh | 292/336.3 |
| 5,024,404 A | * | 6/1991 | Ballard | 248/62 |
| 5,199,675 A | * | 4/1993 | DeGuchi | 248/62 |
| 5,927,920 A | * | 7/1999 | Swanstrom | 411/180 |
| 5,944,467 A | * | 8/1999 | Yuta | 411/433 |
| 6,514,027 B1 | * | 2/2003 | Yiu et al. | 411/433 |
| 6,625,851 B1 | * | 9/2003 | Martin et al. | 24/462 |
| 6,631,876 B1 | * | 10/2003 | Phillips | 248/74.2 |
| 6,652,209 B2 | * | 11/2003 | Hoffmann | 411/438 |
| D482,956 S | * | 12/2003 | Pyron | D8/382 |

FOREIGN PATENT DOCUMENTS

| | | |
|---|---|---|
| JP | 59-77608 | 5/1984 |
| JP | 02256908 | * 10/1990 |
| JP | 4-73308 | 6/1992 |
| JP | 7-286516 | 10/1995 |
| JP | 10-145935 | 5/1998 |
| JP | 10-145937 | 5/1998 |
| JP | 2001-154816 | 6/2000 |
| JP | 2001-12670 | 1/2001 |
| JP | 2001-314012 | 11/2001 |
| JP | 2002-339918 | 11/2002 |

OTHER PUBLICATIONS

Kazuo et al., Mitsubishi Electric Home Applicant Co., Ltd., Connecting Tool, Abstract of JP4113007, 1992.

* cited by examiner

MOUNTING BODY 100 (NUT BODY)
ADJACENT PORTION 30
ENGAGEMENT PORTION 20
ENGAGEMENT PROJECTION 21 (GROOVE 22)
OPENING PORTION 70

100 (110)
20
30
BOLT BODY 300 (OUTER THREAD 310)

DEVIATION PREVENTING PORTION 40

DEPRESSION

COMB TEETH-SHAPED CONCAVITY AND CONVEXITY

RECEIVING DEVICE FOR WIRING MATERIAL AND PIPING MATERIAL

THROUGH HOLE intermediate insertion type nut

--PRIOR ART--

--PRIOR ART-- receiving device

--PRIOR ART--

MOUNTING BODY FOR ATTACHMENT TO BOLT BODY AND NUT BODY

TECHNICAL FIELD

The present invention relates to a mounting body which can be mounted to a bolt body, and more particularly, a mounting body to a bolt body which can be easily and securely mounted to a position apart from an end portion of the bolt body.

BACKGROUND ART

Conventionally, when installing a cable rack (a receiving device) for arranging a wiring material and a piping material in a station or a plant, it is generally carried out to fix same to a bolt body suspended from a ceiling (or buried in the ground) by means of a nut. Further, in the case of installing various other plant materials in a building, the plant materials are fixed to a bolt body fixed to a construction thing of the building so as to install same.

In particular, in the case in which the plant materials are fixed to an intermediate position of the bolt body by the nut body, the fixation to the bolt body is achieved by clamping a connection portion to the bolt body on a subject to be installed such as the cable rack, the box or the like from front and rear sides (or from upper and lower sides) by a plurality of nut bodies. Specifically, as shown in FIG. 43, installation is achieved by clamping a steel product having an approximately L-shaped cross sectional shape between a pair of bolt bodies from upper and lower sides by two nuts, and mounting the cable rack on the L-shaped steel product.

However, in order to fix the placed subject to the intermediate position of the long bolt body, it is necessary to rotate and move forward the nut body at a significant distance from an end portion of the bolt body. Accordingly, it is very difficult to install the placed subject.

However, in order to fix the placed subject to the intermediate position of the long bolt body, it is necessary to rotate and move forward the nut body at a significant distance from an end portion of the bolt body. Accordingly, it is very difficult to install the placed subject.

In accordance with the present invention, since the mounting portion is integrally provided in the connection portion to the bolt body in the placed subject, such as the cable rack, the box and the like, it is only possible to mount the bolt body by applying the mounting portion from a side portion of the bolt body and applying a simple force.

On the other hand, the conventional nut is screwed forward in an axial direction of the bolt body by rotating and moving same forward from one end of the bolt body. Here, in the case that the nut body or the like has already been screwed and fixed to a predetermined position and the other positions in the bolt body, it is impossible to rotate and move forward a new nut body into the fixed interval.

Accordingly, as shown in FIG. 41, there has been proposed an interposition type nut manufactured by SLIP ON LOCK NUT CO., LTD., (U.S.A.). The interposition type nut is constituted, as shown in FIG. 41, by a pair of nut bodies, and each of a pair of nut bodies is provided with an opening in one side. Further, the respective nut bodies are pressed to each other by rotating the respective nut bodies in opposite directions, as shown in FIG. 42, after moving forward the bolt body from the opening, whereby the respective nut bodies stay in the positions.

Therefore, in accordance with the technique on the basis of the interpositions type nut, since it is not necessary to rotate and move forward the nut to the bolt body from the end portion thereof, it is possible to horizontally mount same from any positions of the bolt body. Further, this structure can be applied to a position where both ends of the bolt body have been already supported, a position where the mounting position is frequently moved, and a position where the nut fails to be installed until after the execution. Further, as shown in FIG. 43, the placed subject can be installed with respect to the bolt body when the nut body has been already installed at a lower end and an upper end is fixed to the ceiling by mounting the nut body to an intermediate position.

However, in the interposition type nut mentioned above, since an extremely high accuracy is required in a stage of manufacturing, the nut and the structure of the nut is complex, a high unit price per one set of nut mentioned above results. Accordingly, in the case that the interposition type nut mentioned above is frequently used, the implementation cost is increased. Therefore, the interposition type nut is actually used on in a specific position, compensating for the conventional inexpensive nut. Thus, it is necessary to use the conventional inexpensive nut and the expensive interposition type nut together.

DISCLOSURE OF THE INVENTION

The present invention is made by taking the various problems in the prior art mentioned above into consideration, and inexpensively provides a mounting body 100 and a nut body 110 which can be easily mounted from a side portion of a bolt body 300. A description will be given of the mounting body 100.

First, the mounting body 100 in the present invention comprises a receiving device 120 for a wiring material and a piping material (refer to FIG. 29), a box 130 for a wiring material and a piping material (refer to FIG. 35), a suspended metal fitting 140 of the receiving device 120 (refer to FIG. 37), or the like. A mounting portion 10 is provided in the mounting body 100, and the mounting body 100 is mounted to an outer surface of the bolt body 300 by the mounting portion 10. As discussed later, in the present invention, a nut body 110 (refer to FIGS. 1 to 20) is included in the mounting body 100. In other words, the nut body 110 corresponding to the mounting body 100 can be structured by independently constructing a structure corresponding to the mounting portion 10 in the receiving device 120 or the like.

The mounting portion 10 mentioned above is provided as a part of the mounting body 100 corresponding to the mounting subject. The mounting portion 10 is provided with an engagement portion 20, an adjacent portion 30 provided in a leading end of the engagement portion 20 and an opening portion 70 moving the bolt body 300 into the engagement portion 20. An engagement projection 21, engaging an outer thread 310 of the bolt body 300, is provided in a protruding manner on one surface of the engagement portion 20.

Further, the mounting portion 10 in the present invention is moved close to the bolt body 300 by applying the engagement portion 20 of the mounting portion 10 to the outer surface of the bolt body 300 corresponding to the mounted subject from a side portion thereof. Thereafter, the engagement portion 20 is plastically deformed by relatively moving the adjacent portions 30 close to each other, whereby the engagement portion 20 is arranged along the outer surface of the bolt body 300. It is possible to maintain a state in which the engagement projection 21, protruding on the surface of the engagement portion 20, is engaged with an outer thread 310 of the bolt body 300 by arranging (closely attaching) the engagement portion 20 along the outer surface of the bolt body 300.

Thus, it is possible to engage the mounting portion 10 with the outer thread 310 of the bolt body 300, and it is possible to mount the mounting body 100 corresponding to the mounted subject to the outer surface of the bolt body 300.

In accordance with the present invention, it is possible to maintain a state in which the engagement projection 21 is engaged with the outer thread 310 of the bolt body 300 only by plastically deforming the engagement portion 20 in connection with the mounting portion 10. It is also possible to mount the mounting body 100 to the bolt body 300.

In this case, as mentioned above, since the engagement portion 20 is plastically deformed after being applied and arranged from the side portion of the outer surface in the bolt body 300, it is possible to mount the mounting body 100, regardless of whether mounting occurs at the end portion or the intermediate portion of the bolt body 300.

Next, a description will be first given of the engagement portion 20 with respect to the structure of the mounting portion 10.

The engagement portion 20 is structured such that the engagement portion 20 itself is plastically deformed, thereby being brought into contact with (closely attached to) the bolt body 300 in connection with the mounted subject so as to clamp the bolt body 300. However, the specific structure of the engagement portion 20 is not particularly limited. There can be considered, for example, a structure in which a flat plate is bent and a pair of band-shaped members are provided so as to stand face to face, as shown in FIG. 3 or 8, or a structure in which a base member of the mounting body 100 is cut and raised and a pair of band-shaped members are provided so as to stand face to face, as shown in FIG. 29. In this case, the engagement portion 20 shown in FIG. 29 includes a flat surface shape portion formed in a side of an opposite opening portion 70, in addition to a pair of band-shaped members. In other words, the engagement portion 20 in the present invention is not limited to a pair of band-shaped members, but includes a portion which is held between the respective band-shaped members so as to be brought into contact with the bolt body 300.

The opening portion 70 is formed between a pair of band-shaped members. The bolt body 300, in accordance with the mounted subject, is moved forward from the opening portion 70 so as to be plastically deformed. When the engagement portion 20 is formed by providing a pair of band-shaped members so as to stand face to face as shown in FIG. 25, it is further preferable to closely attach the engagement portion 20 to the entire outer surface of the bolt body 300 in accordance with the mounted subject, as shown in FIG. 26, after plastically deforming the engagement portion 20. In order to achieve same, it is contemplated that the entirety of the pair of band-shaped members is formed in approximately the same size as an outer peripheral dimension of the bolt body 300.

Further, the engagement portion 20 is provided with an engagement projection 21 engaging with the outer thread 310 of the bolt body 300 in a protruding manner, and the adjacent portion 30 is formed by folding the leading end.

In the case which the bolt body 300 is clamped by bringing the engagement portion 20 into contact with the bolt body 300 (closing and/or attaching the engagement portion 20 to the bolt body 300), the engagement portion 20 is plastically deformed, and the engagement projection 21 provided in the engagement portion 20 in a protruding manner is engaged with the outer thread 310 of the bolt body 300. The engagement projection 21 is engaged with the outer thread 310 of the bolt body 300, whereby it is possible to prevent the mounting body 100 corresponding to the mounted subject from being displaced with respect to the axial direction of the bolt body 300.

The engagement portion 20 may employ any material so long as the material can be plastically deformed itself. Specifically, it is considered to be preferable that the engagement portion 20 is formed by a metal (a steel plate) and a deformed state can be maintained after being deformed. Accordingly, it is possible to maintain the state in which the engagement projection 21 is engaged with the outer thread 310 of the bolt body 300 mentioned above, by plastically deforming the engagement portion 20, and it is possible to continuously mount the mounting body 100 corresponding to the mounted subject to the bolt body 300.

It is possible to plastically deform the engagement portion 20, mentioned above, by relatively moving the adjacent portion 30 provided in the leading end side of the engagement portion 20 close to each other. The adjacent portion 30 may be formed as a grip piece corresponding to a gripping portion at a time of plastically deforming the engagement portion 20. As shown in FIGS. 25 and 26, it is possible to easily, plastically deform the engagement portion 20 along the outer surface of the bolt body 300 by gripping the adjacent portion 30 by a pitching tool P, such as a pincher or the like, at a time of plastically deforming the engagement portion 20, and clamping this at a breath (or step by step).

Further, the adjacent portion 30, mentioned above, may be previously provided so as to protrude toward a slightly leading end direction (a lower side in FIG. 27) of the engagement portion 20, as shown in FIG. 27. By arranging the adjacent portion 30 so as to incline to the slightly leading end direction of the engagement portion 20, it is possible to more easily clamp by means of the pinching tool P.

In this case, the engagement projection 21, mentioned above, is engaged with the outer thread 310 of the bolt body 300, and the following structure can be considered as a specific structure thereof. The structure is made such that one or two or more projections (the engagement projection 21) that are provided in a protruding manner on the contact surface of the outer surface of the bolt body 300 in accordance with the mounted subject, and the projection is engaged with the outer thread 310 of the bolt body 300. The structure may be made such that a groove 22 is spirally inscribed on the contact surface mentioned above, and the spirally inscribed surface is engaged with the outer thread 310 of the bolt body 300. As shown in each of the drawings, since the entire spirally inscribed surface can be engaged with the outer thread 310 of the bolt 300 by spirally inscribing the groove 22 on the engagement surface, it is possible to strongly and securely engage the engagement portion 20 with the bolt body 300. At this time, it is considered to be preferable that the groove 22 is spirally inscribed at a pitch corresponding to the outer thread 310 of the bolt body 300 in accordance with the mounted subject. When employing the structure mentioned above, since the entire spirally inscribed surface is engaged with the outer thread 310 of the bolt body 300, it is possible to effectively prevent the mounting body 100 from being displaced in the axial direction of the bolt body 300.

The time when the engagement projection 21 is engaged with the outer thread 310 of the bolt body is not limited to a time before the engagement portion 20 is plastically deformed or a time after the engagement portion 20 is plastically deformed.

For example, when the mounting body 100 (the nut body 110) shown in FIG. 1 is brought into contact with the outer surface of the bolt body 300, as shown in FIG. 25, the engagement projection 21, provided in a protruding manner in an inner side of a portion (an upper half circle portion), corresponding to an arc in the mounting body 100 (the nut body 110), is engaged with the outer thread 310 of the bolt body 300. In other words, the mounting body 100 (the nut body 110) shown in FIG. 25 can be set to a temporarily fastened state on the basis of an engagement of the engagement projection 21 with the outer thread 310, achieved only by applying (contacting) the engagement portion 20 to the side surface of the bolt body 300 without plastically deforming the engagement portion 20. Further, the engagement with the outer thread by the engagement projection 21 is secured from the temporarily fastened state mentioned above by plastically deforming the engagement portion 20. In accordance with the employment of the structure mentioned above, since an operator for installation can achieve the temporary fastening by applying the mounting body 100 to the bolt body 300, it is possible to attend only to the plastically deforming work at a time of thereafter plastically deforming the engagement portion 20. Therefore, it is possible to securely mount the mounting body 100 to a desired position in the bolt body.

On the other hand, for example, in the mounting body 100 (the nut body 110) which is formed slightly larger than a diameter of the bolt body 300, as shown in FIG. 19, the engagement projection 21 is not engaged with the bolt body 300 only by bringing the mounted body 100 (the nut body 110) into contact with the bolt body 300. In other words, the engagement projection 21 is engaged with the outer thread 310 only by plastically deforming the engagement portion 20 in which the engagement projection 21 is provided in a protruding manner.

Further, in the present invention, the mounted subject is the bolt body 300, and the engagement projection 21 of the engagement portion 20 is engaged with the outer thread 310 of the bolt body 300 as mentioned above. Accordingly, it is possible to move the mounting body 100 with respect to the axial direction of the bolt body 300 by rotating the bolt body 300 (or rotating with respect to the bolt body 300) in a state in which the engagement projection 21 in the mounting body 100 is engaged with the outer thread 310 of the bolt body 300.

It is possible to move (elevate) the mounting body 100 in the axial direction of the bolt body 300 by rotating the bolt body 300, in a state in which the mounting body 100, for example, the wiring material piping material receiving device 120, the wiring box 130 and the like corresponding to the mounted subject, is bonded to the bolt body 300 such as the suspended bolt which is suspended from the ceiling or the support bolt which is stood by fixing one end to the floor surface. Accordingly, in the case of changing the mounting position of the mounting body 100 to an optimal position on an entire length of the bolt body 300, the mounting body 300 can be moved by rotating the mounting body 100 with respect to the bolt body 300 in a state in which the mounting body 100 is mounted to the bolt body 300, or rotating the bolt body 300.

Further, the engagement portion 20 mentioned above may be constituted by a multi-layer structure. The engagement portion 20 in accordance with the multi-layer structure has an inner member 62 and an outer member 61, as shown in FIG. 20. Further, the inner member 62 is structured by a plastic material and the outer member 61 is structured by a metal which can be plastically deformed. Accordingly, the outer member 61 presses the inner member 62 by plastically deforming the outer member 61, whereby the inner member 62 is pressed between the outer member 61 and the outer thread 310 of the bolt body 300.

Since the inner member 62 is structured by the plastic material, the inner member 62 is pressed to the outer thread 310 of the bolt body 300, thereby eating into the outer thread 310 of the bolt body 300. As in the inner member 62 eats into the outer surface of the bolt body 300, the surface in the inner member 62, which is brought into contact with the outer thread 310 of the bold body 300, is deformed along the outer thread 310 of the bolt body 300. Accordingly, the engagement projection 21 is formed on the surface in the inner member 62 which is brought into contact with the outer thread 310 of the bolt body 300, and the engagement projection 21 is engaged with the outer thread 310 of the bolt body 300. Accordingly, it is possible to control axial movement with respect to the bolt body 300, and it is possible to mount the mounting body 100 provided with the mounting portion 10 without moving in the axial direction with respect to the bolt body 300.

Next, a description is given of the adjacent portions 30. The adjacent portions 30 are provided in the leading end side of the engagement portion 20 mentioned above, and correspond to the portions which are relatively close to each other by plastically deforming the engagement portion 20.

Further, the adjacent portion 30 makes mounting easy by being gripped as a grip piece at a time of plastically deforming the engagement portion 20. In order to plastically deform the engagement portion 20, the pinching operation by the pinching tool P can be easily and securely achieved by gripping the adjacent portion 30 with the pinching tool P, such as a pincher or the like, as shown in FIGS. 25 and 26.

As a specific aspect of adjacent portion 30, it is contemplated to employ a pair of adjacent portions 30 or a piece of adjacent portion 30.

First, a pair of adjacent portions 30 are structured such that a pair of engagement portions 20 of the mounting portion 10 are provided so as to relatively stand face to face, and a pair of adjacent portions 30 are formed by providing an adjacent portion 30 at each of the leading end sides of the engagement portions 20. Further, the engagement portion 20 is plastically deformed by moving forward the bolt body to the opening portion 70 between the adjacent portions 30 and thereafter moving the adjacent portions 30 close to each other.

Next, a piece of adjacent portions 30 is formed by folding the leading end of the engagement portion 20 to an outer side. In this case, the engagement portion 20 is formed in an approximately U-shaped cross section extending from a base end of the mounting portion 10 in the mounting body 100. Further, in order to move the adjacent portion 30 formed in the leading end of the engagement portion 20 close to a portion near the base end of the engagement portion 20 in an approximately close contact state, the engagement portion 20 is plastically deformed after moving forward the bolt body into an inner side of the engagement portion 20 which has the U-shaped cross section from the opening portion 70.

Further, in order to engage projection 21 with the outer thread 310 of the bolt body 300, the engagement portion 20 may be plastically deformed until the adjacent portions 30 provided in the leading end side of the engagement 20 are in approximately close contact with each other. The engagement projection 21 provided in a protruding manner in the engagement portion 20 is engaged with the outer thread 310 of the bolt body 300 by clamping the adjacent portions 30 by means of the pinching tool P, such as a pincher or the like, until the adjacent portions 30 are relatively in an approximate contact state.

Accordingly, the adjacent portions 30 are relatively in the approximate close contact state by finishing the engagement with the outer thread 310 of the bolt body 300 by means of the engagement projection 21. Therefore, the opening portion 70 (refer to FIG. 25) between the engagement portions 20 standing face to face is covered and closed by the adjacent portions 30 in the approximate close contact state. Accordingly, the bolt body 300 engaging the engagement portion 20 can be prevented from coming off from the opening portion 70, and it is by extension possible to securely mount the mounting body 100 to the bolt body 300.

Further, in the case in which the engagement is finished by positioning the adjacent portions 30 in the approximate close contact state with each other, as mentioned above, a target for finishing the engagement is set, so that it is possible to necessarily and sufficiently deform the engagement portion 20 plastically. Accordingly, it is possible to prevent the bolt body 300 from coming off from the mounting portion 10.

On the other hand, the mounting body 100 in accordance with the present invention may be structured such that the mounting body 100 is provided with a holding portion 50 for holding a secondary mounting body 200. The mounting body is mounted to the bolt body 300 in a state in which the holding portion 50 holds the secondary mounting body 200, whereby the secondary mounting body 200 is mounted to the bolt body 300. The secondary mounting body 200 is structured such as to be placed in the bolt body 300 and be provided with no mounting portion 10. Specifically, as shown in FIG. 33 or 36, it is contemplated that a wiring material and piping material receiving tool or a wiring material and piping box may be provided with no mounting portion 10. Further, the secondary mounting body is not particularly limited to these, and widely include a structure which is fixed by the mounting body 100 in accordance with the present invention, such as a saddle for fixing the wiring material and the piping material. In the example of the saddle mentioned above, the wiring material and the piping material fixed by the saddle are not included in the secondary mounting body 200 mentioned above. Thus, only a structure which is directly fixed by the mounting body in accordance with the present invention corresponds to the secondary mounting body 200.

In order to mount the secondary mounting body 200 to the bolt body 300 in accordance with the mounted subject, the secondary mounting body 200 can be mounted to the bolt body 300 by mounting to the bolt body 300 while keeping the state in which the secondary mounting body 200 is held by the holding portion 50 provided in the mounting body 100.

The holding portion 50 may employ any methods or structures. Specifically, for example, as shown in FIG. 3, it is contemplated that a structure, in which the holding portion 50 is constituted by a flat-shaped contact surface, is formed between a pair of engagement portions 20 standing face to face. The secondary mounting body 200 is clamped between the holding portion 50 and the bolt body 300, and the secondary mounting body 200 is mounted to the bolt body 300. In order to clamp the secondary mounting body 200 between the holding portion 50 and the bolt body 300, for example, it is contemplated that a pair of through holes are pierced in the secondary mounting body 200, as shown in FIGS. 33 or 36. Further, the engagement portion 20 of the mounting body 100 provided with the holding portion 50 is inserted into a pair of through holes. The engagement portion 20 is applied to the outer surface of the bolt body 300 from the side portion, and the adjacent portions 30 are gripped and clamped by the pinching tool P so as to be plastically deformed, as shown in FIGS. 31 and 32. At this time, since the portion between the pair of through holes in the secondary mounting portion 200 is clamped between the holding portion 50 and the bolt body 300, the secondary mounting body 200 can be mounted to the bolt body 300. In this case, the adjacent portion 30 provided in the leading end of the engagement portion 20 may be provided so as to be inclined in the leading end direction of the engagement portion so as to be more easily clamped by the pinching tool P, as shown in FIG. 27.

On the other hand, the mounting body 100 in accordance with the present invention may be provided with a held portion 51 in which the secondary mounting body 200 is placed, and may be structured such that the secondary mounting body 200 can be placed in the held portion 51 after mounting or before mounting the mounting body 100 to the bolt body 300. Specifically, as shown in FIG. 39, it is contemplated that a plate-shaped mounting body 100 is formed by punching a predetermined position of a plate-shaped member so as to form the engagement portion 20 or the adjacent portion 30. A threaded hole is formed in the plate-shaped mounting body 100. The secondary mounting body 200 is placed (fixed) by screwing the secondary mounting body 200 to the threaded hole.

In accordance with the mounting body 100 provided with the held portion 51, by only bringing the engagement portion 20 into contact with the bolt body 300, it is possible to easily place a conventionally provided pedestal to which various materials can be fixed. In this case, the method of fixing the held portion 51 and the secondary mounting body 200 is not limited to the screwing mentioned above, and the held portion 51 and the secondary mounting body 200 can be fixed (placed) in accordance with all methods, such as a fitting method, a hooking method, an adhering method and the like which have been conventionally proposed.

Further, the mounting body 100, in accordance with the present invention, may be structured such that the mounting portion 10 is provided with a deviation preventing portion 40 or the like. The deviation preventing portion 40 or the like is structured such as to maintain a state in which the engagement portion 20, mentioned above, is plastically deformed along the outer surface of the bolt body 300. It is possible to prevent the adjacent portion 30, which are relatively moved close to each other by plastically deforming the engagement portion 20, from being again deviated from each other. It is also possible, by extension, to maintain a state in which the engagement projection 21, provided in a protruding manner on the engagement portion 20, is engaged with the outer thread 310 of the bolt body 300 (hereinafter, referred to as a "deviation preventing effect (opening stop)").

The deviation preventing portion 40 or the like comprises the deviation preventing portion 40 and a deviation preventing member 41 as already mentioned. A description is given below of each of them.

First, the deviation preventing portion 40 is integrally structured with the mounting portion 10 in the mounting body 100, and achieves the deviation preventing effect (opening stop). In other words, it is possible to finish the plastic deformation of the engagement portion to lock same by the deviation preventing portion, on the basis of one clamping work by integrally structuring the deviation preventing portion 40 with the mounting portion 10. In particular, as shown in FIG. 4, when a pair of adjacent portions 30 are provided in the leading end of the engagement portion 20, it is contemplated that a hook-shaped member is integrally provided only in one adjacent portion 30 of a pair of adjacent portions 30, and another adjacent portion 30 is locked with the hook-shaped member provided in one adjacent portion 30 (refer to FIG. 5). Accordingly, in the case of mounting to the bolt body 300 by the mounting portion 10 provided with the hook-shaped member, it is possible to prevent the adjacent portions 30 from being deviated from each other by locking one of the adjacent portions 30 with the hook-shaped member while relatively moving the adjacent portion 30 provided in the leading end of the engagement portion 20 in order to plastically deform the engagement portion 20 along the outer surface of the bolt body 300.

On the other hand, the deviation preventing member 41 is structured as an independent member from the mounting portion 10, and achieves the deviation preventing effect (opening stop) mentioned above. Specifically, as shown in FIGS. 7 to 16, it is contemplated that an independent member from the mounting portion 10 is structured such as to be locked with the outer end of the engagement portion 20 or the adjacent portion 30. When the opening stop is achieved by the deviation preventing member 41, first, by clamping the adjacent portions 30 with the pinching tool P, such as a pincher or the like, the engagement portion 20 is plastically deformed and the adjacent portions 30 are relatively close to each other. Further, in order to prevent the adjacent portions 30 moving close to each other from being again deviated, the deviation preventing member 41 locks so as to cover the plastically deformed outer end of the engagement portion 20 or the relatively moving, close adjacent portions 30.

In this case, the deviation preventing member 41 may be structured, as shown in FIG. 11 or 15, such that an opening, open in one side, is formed. It is possible to move forward the bolt body 300 toward the inner portion of the deviation preventing member 41 from the opening. After moving forward the bolt body 300 to the inner portion of the deviation preventing member 41, the deviation preventing member 41 clamps the engagement portion or the adjacent portions in the mounting body 100. It is possible to easily and securely carry out the opening stop by employing the structure mentioned above.

In accordance with the structure mentioned above, it is possible to prevent the adjacent portions 30, which are once moved close to each other, from being again expanded on the basis of the provision of the deviation preventing portion 40 or the like in the mounting portion 10. It is, by extension, possible to completely maintain the mounting state to the bolt body 300 by the mounting portion 10 (or the engagement with the outer thread 310 of the bolt body 300 by the engagement projection 21).

Next, a description is given of a manufacturing process of the mounting portion 10 of the mounting body 100 in accordance with the present invention.

The mounting portion 10 in the present invention may be structured, as shown in FIGS. 22 to 24, by applying a press mold to a steel plate. It is contemplated that the mounting portion 10, having the approximately U-shaped cross section, is formed by arranging the steel plate on a depressed metal mold and pressing the steel plate by a punch from above. In this case, when the engagement projection 21 in the engagement portion 20 is constituted by a groove 22 having a fixed pitch (that is, a spirally inscribed surface), it is considered to be preferable to structure the spirally inscribed surface by forming a plurality of grooves 22 having a fixed pitch in the steel plate prior to press molding. It is preferably to form the groove 22 having a fixed pitch (that is, the spirally inscribed surface) as shown in FIG. 21 by applying a byte blade to the steel plate and moving the byte blade (or the steel plate) in one direction.

On the other hand, the structure may be made such that the groove 22 (the spirally inscribed surface) may be formed at the same time of applying the press mold to the steel plate, despite previously forming the engagement projection as mentioned above. Thus, it is possible to form a threaded groove-shaped engagement projection 21 (the groove 22) at a position corresponding to the inner side of the engagement portion by pressing the steel plate into the metal mold as shown in FIGS. 22 to 24 by means of a punch provided with a spirally inscribed blade in a leading end.

Next, a description is given of the nut body 110. The nut body 110 is a nut body 110 which is screwed from a side surface of the bolt body 300, and has an engagement portion 20 and the adjacent portions 30. In the present invention, the nut body 110 is structured such that the mounting portion 10 in the mounting body 100 is constructed as an independent member and is mounted to the outer surface of the bolt body 300, as the nut body 110.

The nut body 110 can be mounted to the bolt body by applying same to an intermediate portion of the bolt body, in which both ends are already fixed and closed, from a side portion so as to plastically deform, as shown in FIG. 28, whereby it is possible to attach the secondary mounting body, such as the receiving device for the wiring material and the piping material.

As each of the constituting elements in the nut body 110 is the same as that in the mounting body 100 mentioned above, a description thereof is omitted.

FIGS. 1 to 20 show the nut body 110. It is possible to structure a receiving device 120, a box 130 or the like, corresponding to the mounting body provided with the deviation preventing member 41, the double-structure engagement portion 20 or the like, by integrally structuring the nut body 110 as the mounting portion 10 in the mounting body 100, such as the receiving device 120 or the like.

In accordance with the structure mentioned above, when mounting the receiving device 120 or the like, corresponding to the mounting body to the bolt body 300 in accordance with the mounted subject, the mounting operation is finished by first moving the engagement portion 20 in accordance with the mounting portion 10 close to the outer surface of the bolt body 300 from the side portion so as to positioned there, thereafter plastically deforming the engagement portion 20 (through clamping by means of the pinching tool P, such as the pincher or the like), and engaging the engagement projection 21 provided in a protruding manner the engagement portion 20 with the outer thread 310 of the bolt body 300.

Accordingly, it is possible to mount the receiving device 120 or the like corresponding to the mounting body 110 only by applying the receiving device 120 or the like to the bolt body 300 in accordance with the mounted subject from the side portion and applying a simple force thereto. As mentioned above, since the engagement portion 20 is plastically deformed by applying the engagement portion 20 from the side portion of the outer surface in the bolt body 300, it is possible to mount the receiving device 120 or the like regardless of whether it is positioned at the end portion or the intermediate portion of the bolt body 300.

Figure 1:
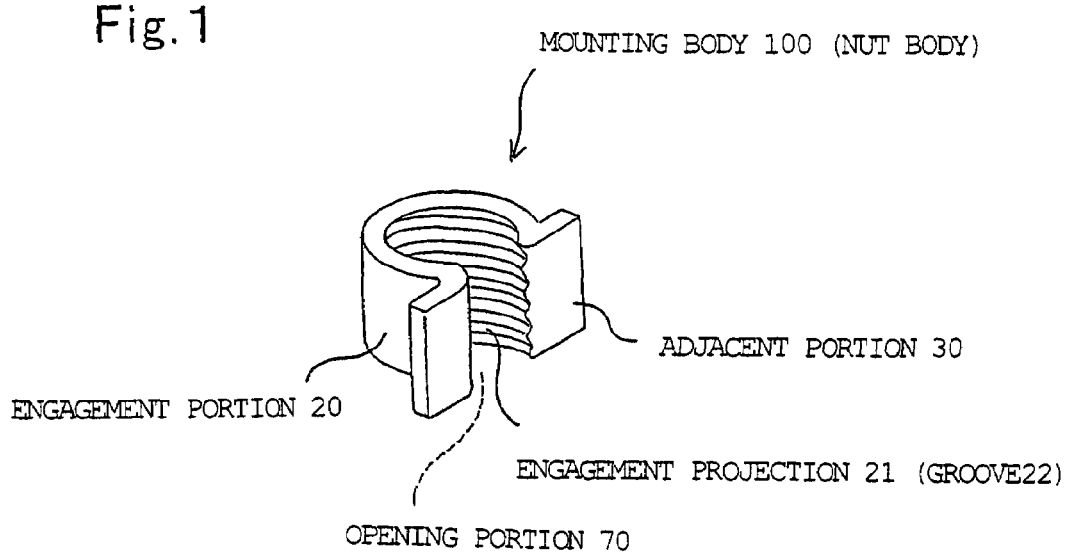
FIG. 1 is a view showing from an upper side a mounting body 100 (a nut body 110) in accordance with the present invention.

DESCRIPTION OF REFERENCE NUMERALS 10 mounting portion
20 engagement portion
21 engagement projection
22 groove
30 adjacent portion (grip piece)
40 deviation preventing portion
41 deviation preventing member
50 holding portion
61 outer member
62 inner member
70 opening portion
100 mounting body
110 nut body
120 receiving device for wiring material and piping material
130 box for wiring material and piping material
140 hanging metal fitting of receiving device
150 pedestal plate
200 secondary mounting body
300 bolt body
310 outer thread
P pinching tool such as pincher or the like

BEST MODE FOR CARRYING OUT THE INVENTION

EMBODIMENT 1

Figure 2:
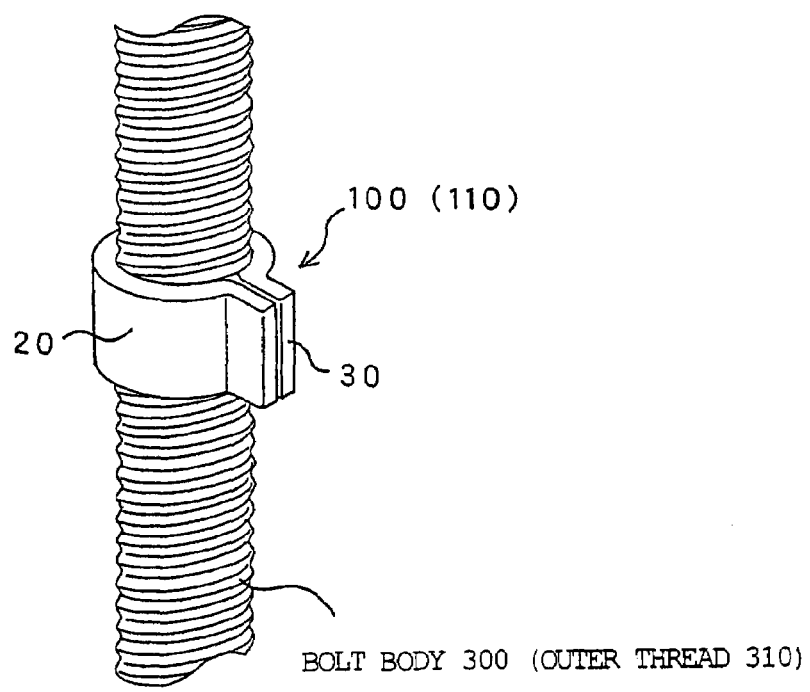
FIG. 2 is a view showing from an upper side a state in which the mounting body 100 (the nut body 110) shown in FIG. 1 is mounted to a bolt body 300 in accordance with a mounted subject.

FIGS. 1 and 2 show a mounting body 100 in accordance with embodiment 1. The mounting body 100 of the present embodiment is structured as a nut body 110, and the nut body 110 has a plastically deformable engagement portion 20, a pair of adjacent portions 30 provided in a leading end side of the engagement portion 20, and an opening portion 70 moving forward a bolt body 300 into the engagement portion 20, as shown in FIG. 1. The engagement portion 20 is provided in a protruding manner with an engagement projection 21 engaging with an outer thread 310 of the bolt body 300 in accordance with a mounted subject.

Figure 25:
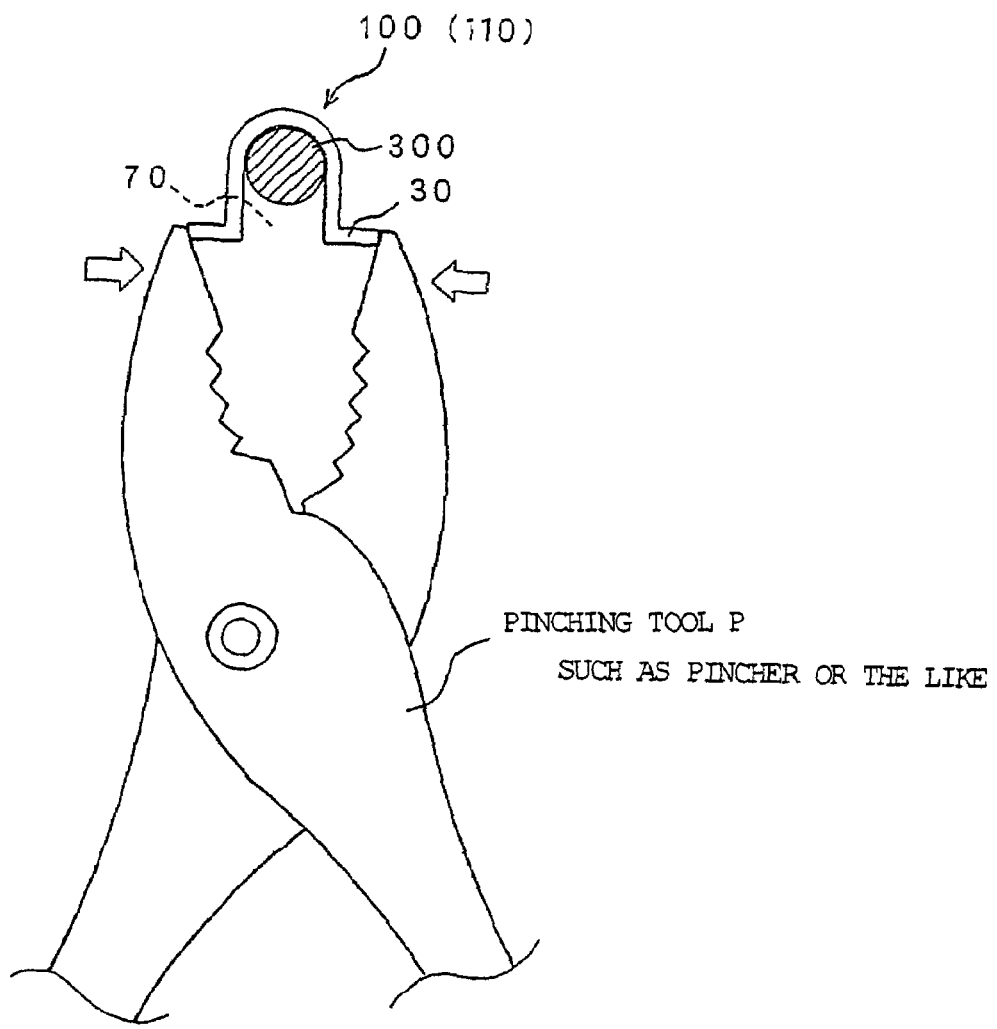
FIG. 25 is a first view showing a process of plastically deforming the engagement portion 20 of the mounting body 100 (the nut body 110) of the present invention.
Figure 26:
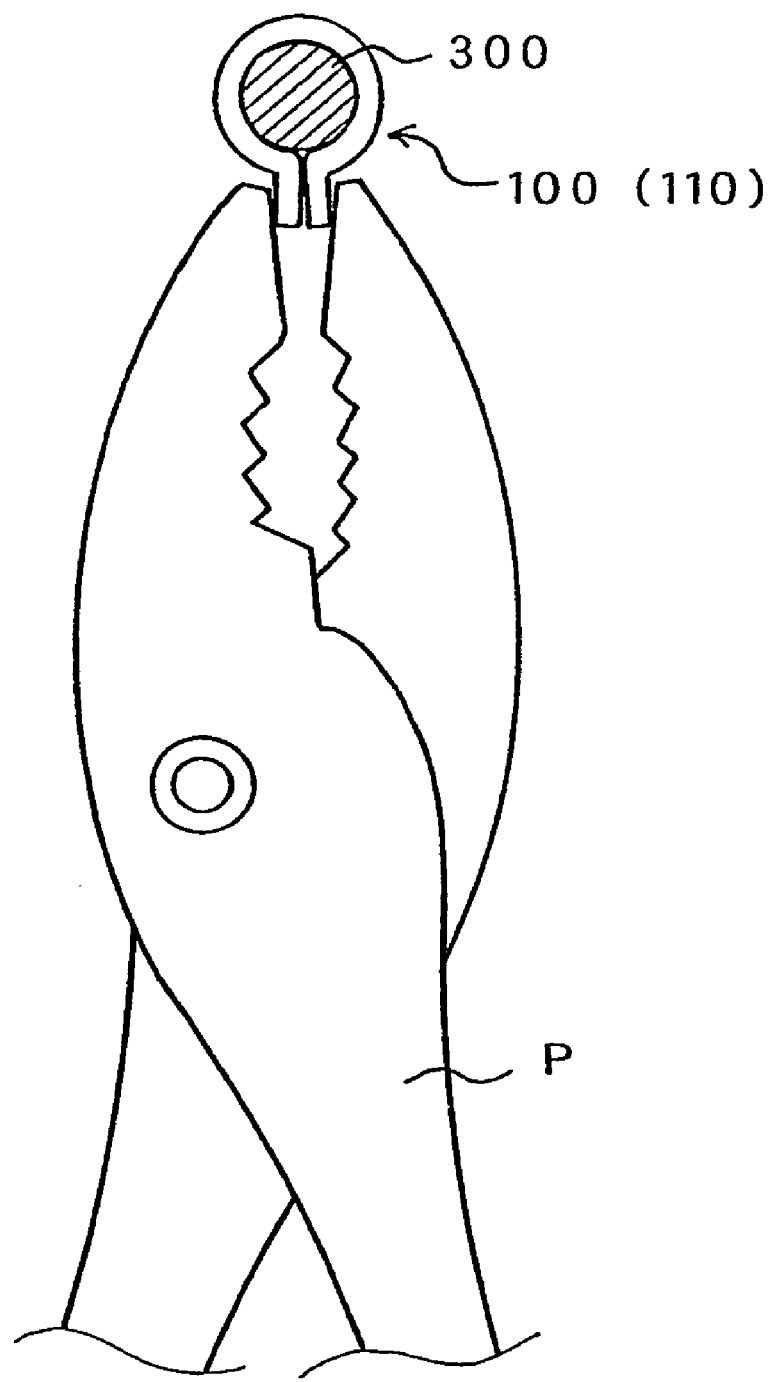
FIG. 26 is a second view showing a process in FIG. 25.
Figure 27:
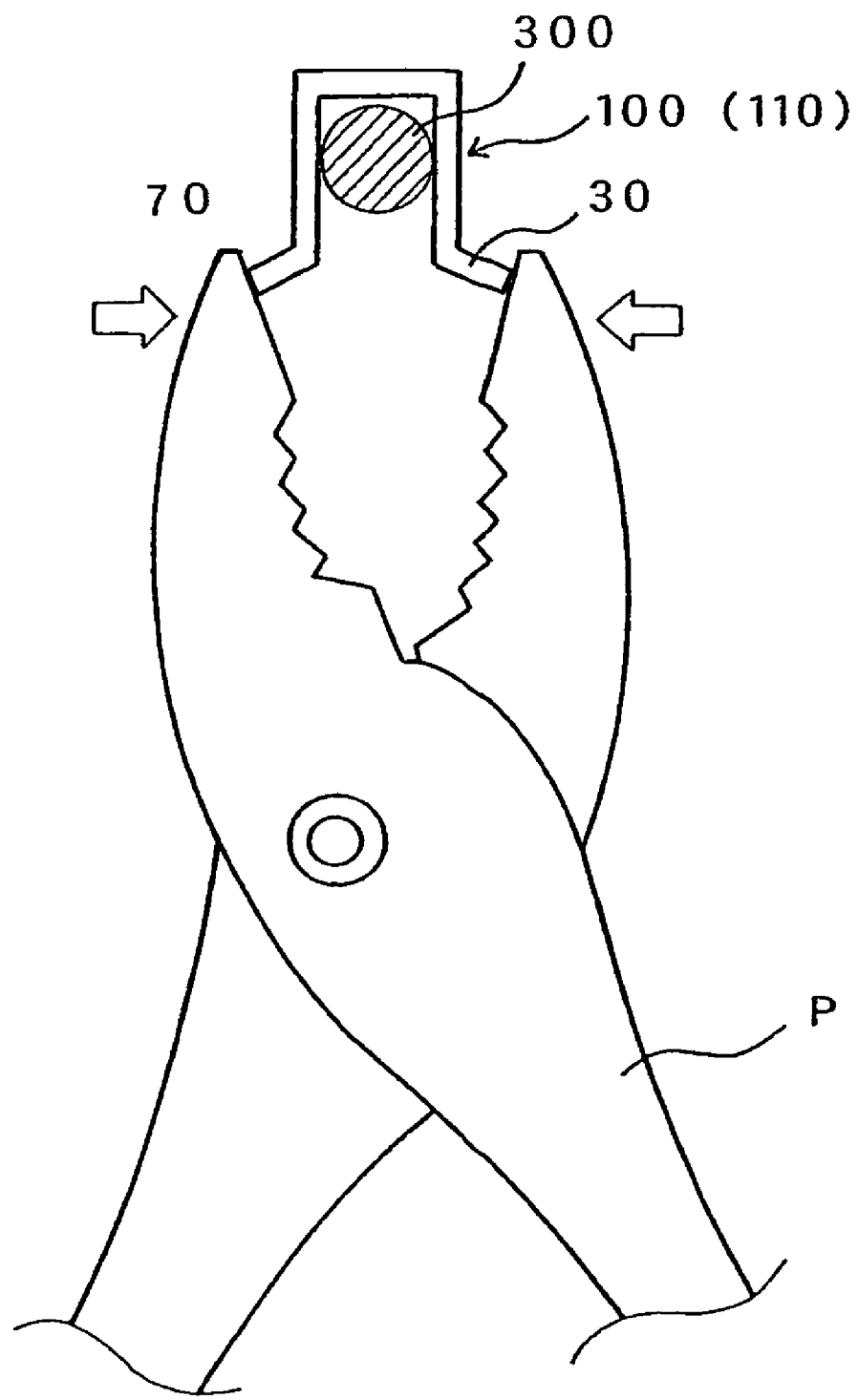
FIG. 27 is a view showing a state in which the adjacent portions 30 of the mounting body 100 (the nut body 110) shown in FIG. 25 are obliquely provided in a leading end direction of the engagement portion 20, and the mounting body 100 (the nut body 110) is gripped by a pinching tool P.

In order to mount the nut body 110 of the present embodiment to the bolt body 300, the bolt body 300 is first moved forward into the engagement portion 20 from the opening portion 70. The engagement portion 20 is arranged by application to an outer surface of the bolt body 300 from a side portion. Next, as shown in FIGS. 25 and 26, a pair of adjacent portions 30 provided in a leading end of the engagement portion 20 are plastically deformed by being clamped by a pinching tool P, such as a pincher or the like, and the engagement projection 21, provided in a protruding manner in the engagement portion 20, is engaged with the outer thread 310 of the bolt body 300. At this time, since a pair of adjacent portions 30, mentioned above, are in approximately close contact, as shown in FIG. 26, the opening portion 70 is covered and closed. Accordingly, the nut body 110 of the present embodiment can be securely mounted without falling off from the bolt body 300.

Figure 28:
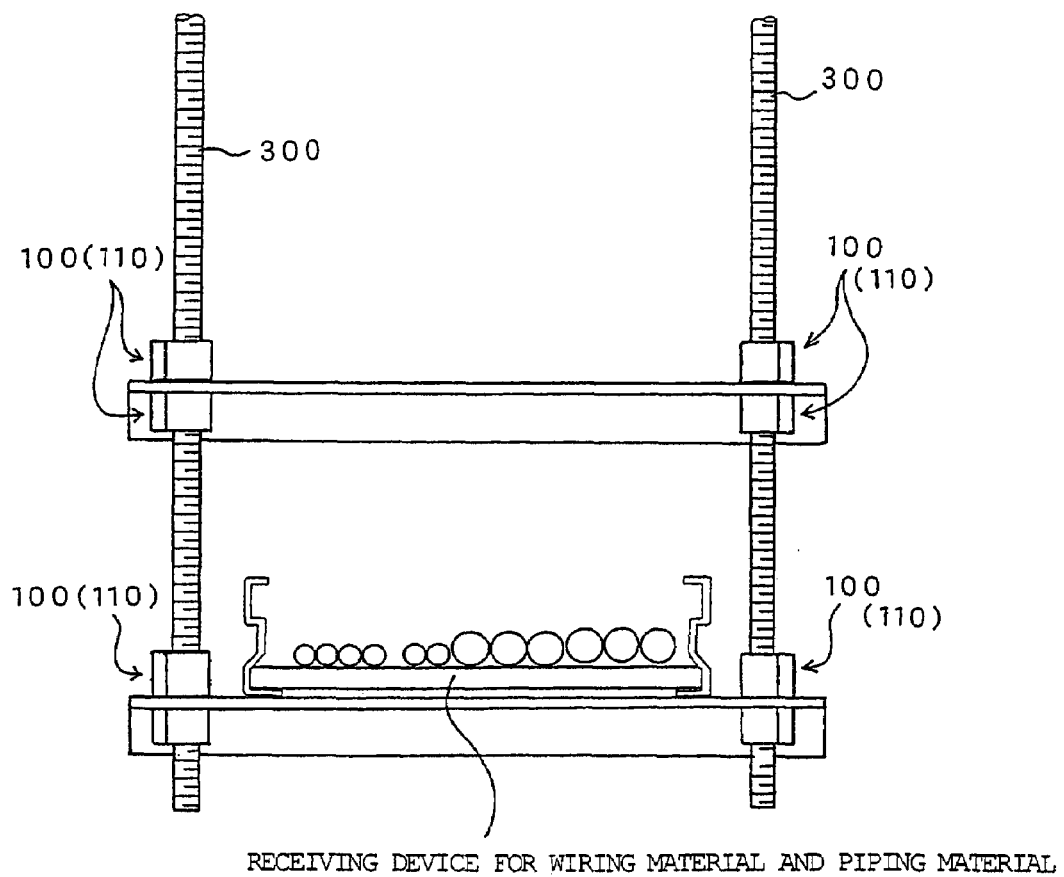
FIG. 28 is a view showing from a front side a state in which a receiving device for a wiring material and a piping material is placed in a pair of bolt bodies 300, in the mounting body 100 (the nut body 110) shown in FIG. 1.

Further, in accordance with the nut body on the basis of the present embodiment, as shown in FIG. 28, it is possible to mount the nut body to the bolt body when both ends are fixed and in a closed state by applying the nut body from a side portion of the bolt body and plastically deforming the nut body.

Figure 3:
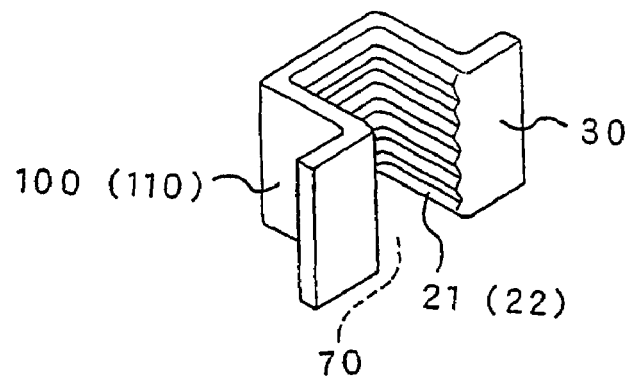
FIG. 3 is a view showing from an upper side a mounting body 100 (a nut body 110) in accordance with another aspect of the present invention.

The cross sectional shape of the nut body 110 of the present embodiment is not limited to an approximately U-shaped cross section, and may employ a cross sectional shape in accordance with a rectangular shape, as shown in FIG. 3.

EMBODIMENT 2

Figure 4:
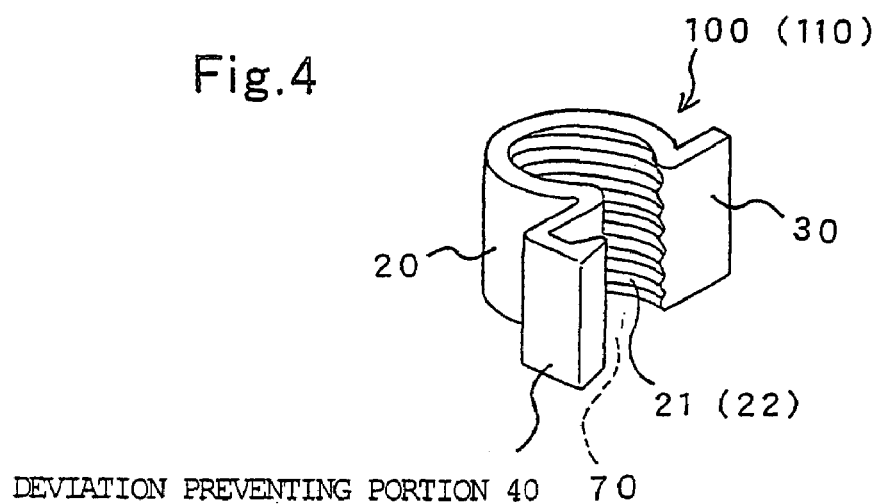
FIG. 4 is a view showing from an upper side a mounting body 100 (a nut body 110) having a hook-shaped deviation preventing portion 40.
Figure 5:
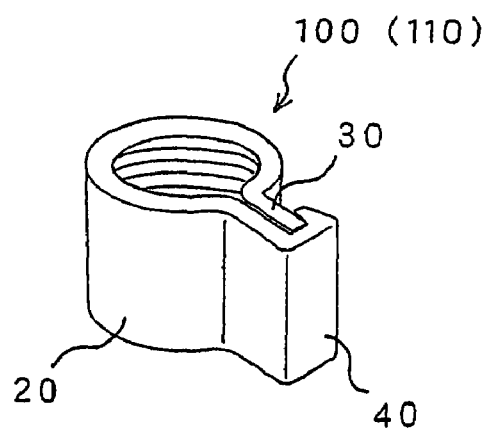
FIG. 5 is a view showing from an upper side a state after plastically deforming an engagement portion 20 of the mounting body 100 (the nut body 110) shown in FIG. 4.

FIGS. 4 and 5 show a mounting body 100 of embodiment 2. The mounting body 100 in the present embodiment is structured as a nut body 110. The nut body 110 has an engagement portion 20, an opening portion 70, adjacent portions 30, and a deviation preventing portion 40 preventing the adjacent portions 30 from being deviated. Since the engagement portion 20, the adjacent portions 30 and the opening portion 70 in the constituting elements are already described with respect to embodiment 1, a description thereof is omitted by attaching the same reference numerals to the drawings.

The deviation preventing portion 40 is integrally formed with the nut body 110, and prevents the adjacent portions 30 provided in the leading end of the mounting portion 10 from being deviated (expanded) from each other (hereinafter referred to as a "deviation preventing effect"). The adjacent portions 30 are deviated from each other, thereby preventing mounting to the bolt body 300 by the nut body 110 from being cancelled.

In the present embodiment, when a pair of adjacent portions 30 are provided in the leading end of the engagement portion 20, a hook-shaped member is integrally provided in only one adjacent portion 30 in a pair of adjacent portions 30, and another adjacent portion 30 is locked to the hook-shaped member provided in the one adjacent portion 30. In the case of mounting the mounting portion 10 provided with the hook-shaped member to the bolt body 300, it is possible to prevent the adjacent portions 30 from being deviated from each other by locking one of the adjacent portions 30 to the hook-shaped member, while at the same time relatively moving the adjacent portions 30 provided in the leading end of the engagement portion 20 toward each other in order to plastically deform the engagement portion 20 along the outer surface of the bolt body 300.

Figure 6:
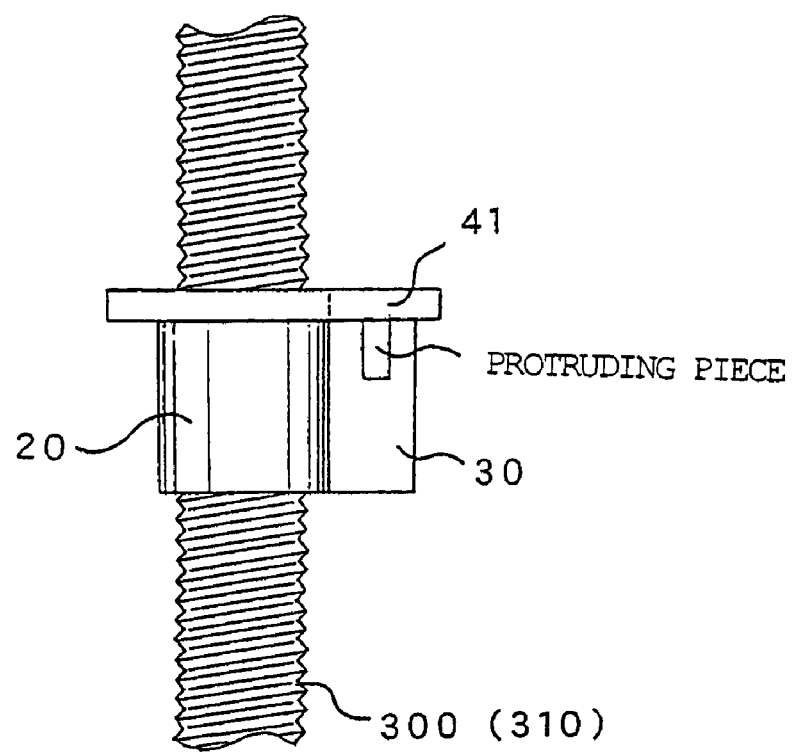
FIG. 6 is a view showing from a side portion a state in which a deviation preventing member 41 in accordance with an independent member is put on the mounting body 100 (the nut body 110) shown in FIG. 1.

The mounting body 100 in the present embodiment is structured such that the deviation preventing effect is generated by the deviation preventing portion 40 integrally provided with the nut body 110. However, the deviation preventing portion 40 is not limited to a structure which is integrally formed with respect to the nut body 100. As shown in FIG. 6, the deviation preventing portion may be structured as a deviation preventing member 41 which is constructed as an independent member from the nut body 110, thereby generating the deviation preventing effect mentioned above. As a specific aspect of the deviation preventing member 41, the structure shown in FIGS. 7 to 16 is considered. A description will be given below of the specific aspect.

Figure 7:
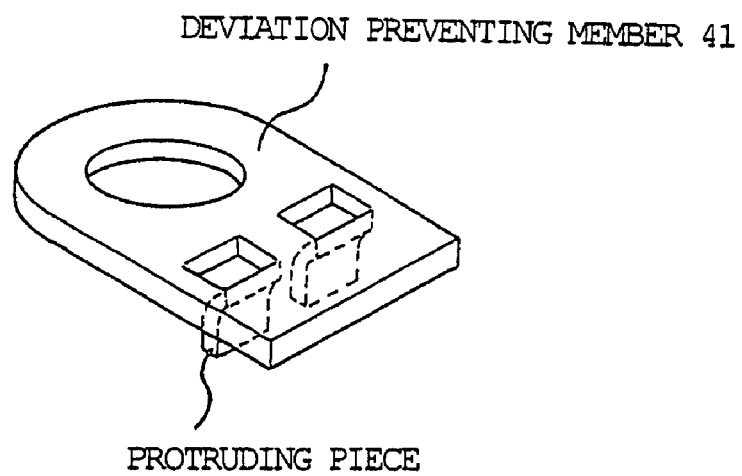
FIG. 7 is a view showing from an upper side the deviation preventing member 41 shown in FIG. 6.
Figure 8:
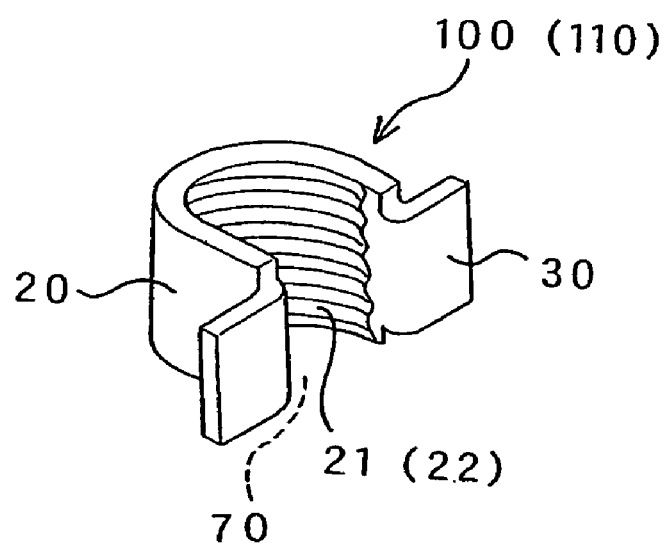
FIG. 8 is a view showing from an upper side a mounting body 100 (a nut body 110) in accordance with the other aspect of the present invention.

First, the nut body 110 shown in FIG. 6 is structured such that a deviation preventing member 41, shown in FIG. 7, is put on the nut body 110 in embodiment 1, and the deviation preventing effect is generated by the deviation preventing member 41. The deviation preventing member 41 shown in FIG. 7 is structured such that a protruding piece is stood up by applying a press mold to a plate-shaped member so as to extrude a predetermined position of the plate. Two projections are provided so as to stand face to face. The deviation preventing effect is generate by pinching the adjacent portions 30 in a relatively close contact state by two projections.

Figure 9:
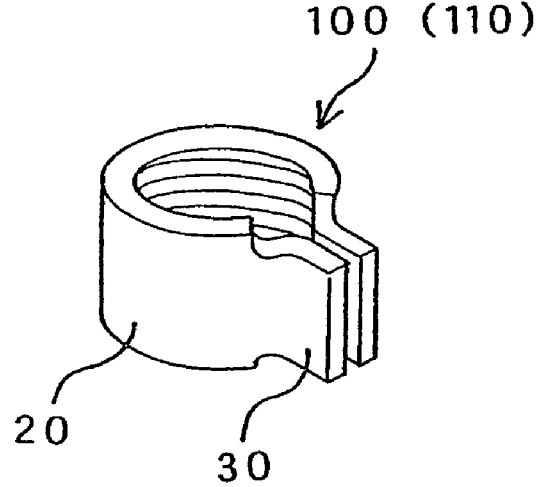
FIG. 9 is a view showing from an upper side a state after plastically deforming an engagement portion 20 of the mounting body 100 (the nut body 110) shown in FIG. 8.
Figure 10:
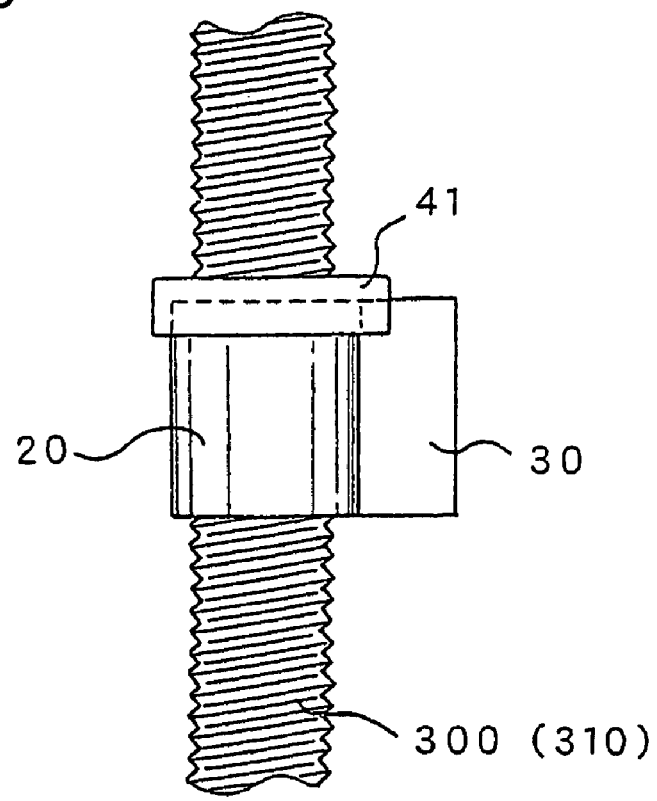
FIG. 10 is a view showing from a side portion a state in which a deviation preventing member 41 in accordance with an independent member is put on the mounting body 100 (the nut body 110) shown in FIG. 8.

Next, a description is given of a nut body 110 as shown in FIG. 10. The nut body 110 shown in FIG. 10 is structured such that the deviation preventing effect is generated by arranging the nut body 110, shown in FIG. 8, near a bolt body 300 in accordance with a mounted subject, thereafter plastically deforming the engagement portion 20, as shown in FIG. 9, and thereafter putting a deviation member 41, shown in FIG. 11, thereon. At this time, the deviation preventing portion 40 does not pinch a pair of adjacent portions 30 which are relatively close to each other, but generates the deviation preventing effect by locking the outer end of the engagement portion 20 by a depression formed in the deviation preventing member 41.

Figure 12:
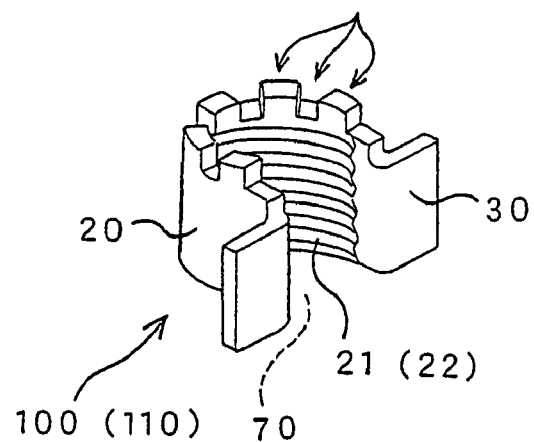
FIG. 12 is a view showing from an upper side a mounting body 100 (a nut body 110) in accordance with the other aspect of the present invention.
Figure 13:
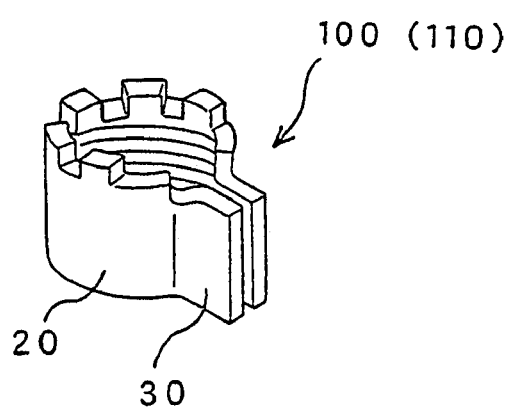
FIG. 13 is a view showing from an upper side a state after plastically deforming an engagement portion 20 of the mounting body 100 (the nut body 110) shown in FIG. 12.
Figure 14:
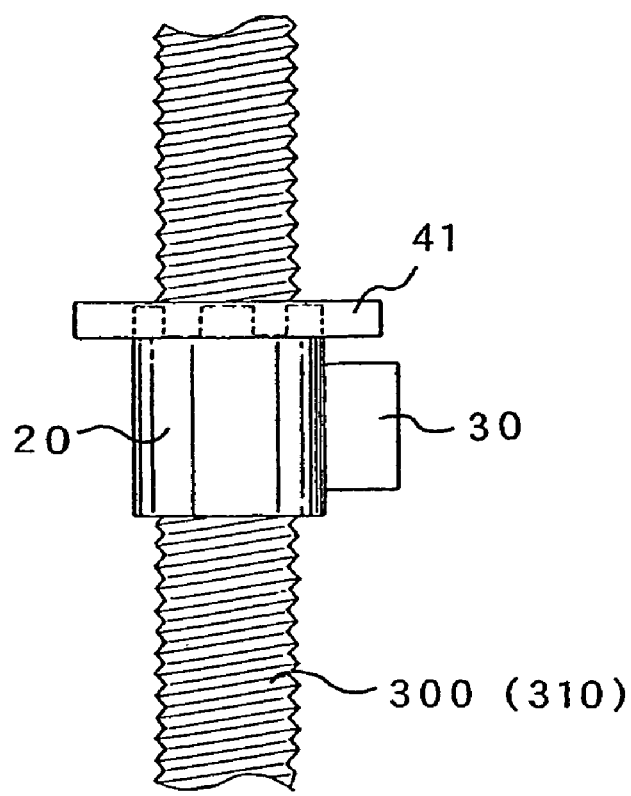
FIG. 14 is a view showing from a side portion a state in which a deviation preventing member 41 in accordance with an independent member is put on the mounting body 100 (the nut body 110) shown in FIG. 12.

Further, a description is given a nut body 110 as shown in FIG. 14. The nut body 110 shown in FIG. 14 is structured such that the deviation preventing effect is generated by arranging the nut body 110, shown in FIG. 12, near the bolt body 300 in accordance with the mounted subject, thereafter plastically deforming the engagement portion 20, as shown in FIG. 13, and putting the deviation preventing member 41, shown in FIG. 15, thereon. In this case, the nut body 110 is structured, as shown in FIGS. 12 to 13, such that one end is formed in a comb teeth-shaped concavity and convexity. On the other hand, a plurality of hole portions are pierced in the deviation preventing member 41 so as to move forward the comb teeth-shaped concavity and convexity in the nut body 110. It is possible to generate the deviation preventing effect mentioned above by engaging a plurality of hole portions and the comb teeth-shaped concavity and convexity with each other.

Figure 16:
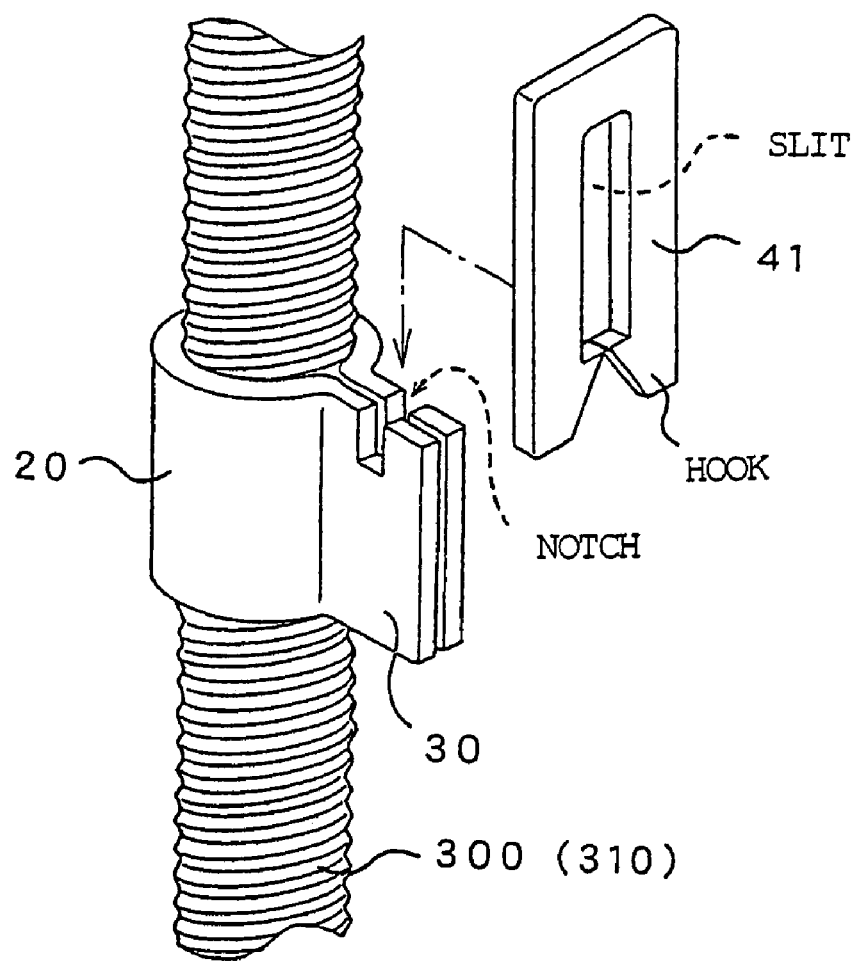
FIG. 16 is a view showing from an upper side a state in which a deviation preventing member 41 in accordance with an independent member having a slit is mounted to a mounting body 100 (a nut body 110) provided with a pair of adjacent portions 30 having a notch.

Further, a description is given of a nut body 110 as shown in FIG. 16. The nut body 110 shown in FIG. 16 is a nut body 110 provided with a deviation preventing member 41. A slit is formed in the deviation preventing member 41 in a state in which one end is connected. A notch is formed in an end portion of each of a pair of adjacent portions 30 in the nut body 110. The adjacent portions 30 are relatively moved close to each other by applying the nut body 110 to the bolt body 300 from a side portion thereof and thereafter plastically deforming the engagement portion 20 as shown in FIGS. 25 and 26. A pair of adjacent portions 30, mentioned above, move forward into the slit of the deviation preventing member 41 by pressing the deviation preventing member 41 against the notch and mentioned above, whereby the pair of adjacent portions 30 are pinched by the deviation preventing member 41.

At this time, the end portion of the deviation preventing member 41 enters into the notch of the adjacent portions 30. Further, a pair of pawls are formed in the end portion of the deviation preventing member 41, and the pawls are engaged with the adjacent portions 30. Accordingly, it is possible to prevent the deviation preventing member 41 from falling off from the nut body 110 on the basis of a lock by these two points.

Figure 11:
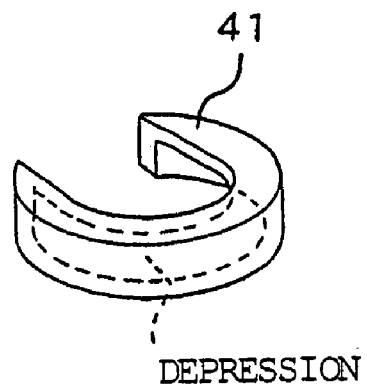
FIG. 11 is a view showing from an upper side the deviation preventing member 41 shown in FIG. 10.
Figure 15:
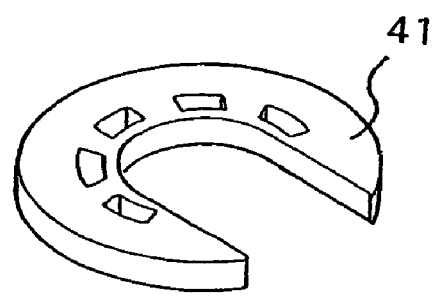
FIG. 15 is a view showing from an upper side the deviation preventing member 41 shown in FIG. 14.

In this case, it is necessary to insert the deviation preventing member 41 shown in FIG. 7 from the end portion of the bolt body 300 to which the mounting body 100 (the nut body 110) is mounted, while mounting the deviation preventing member 41 to the adjacent portions 30 of the mounting portion 100 (the nut body 110). However, since the deviation preventing member 41 shown in FIGS. 11, 15 and 16 is released on one side, it is possible to arrange all from a side portion of the bolt body 300.

EMBODIMENT 3

Figure 17:
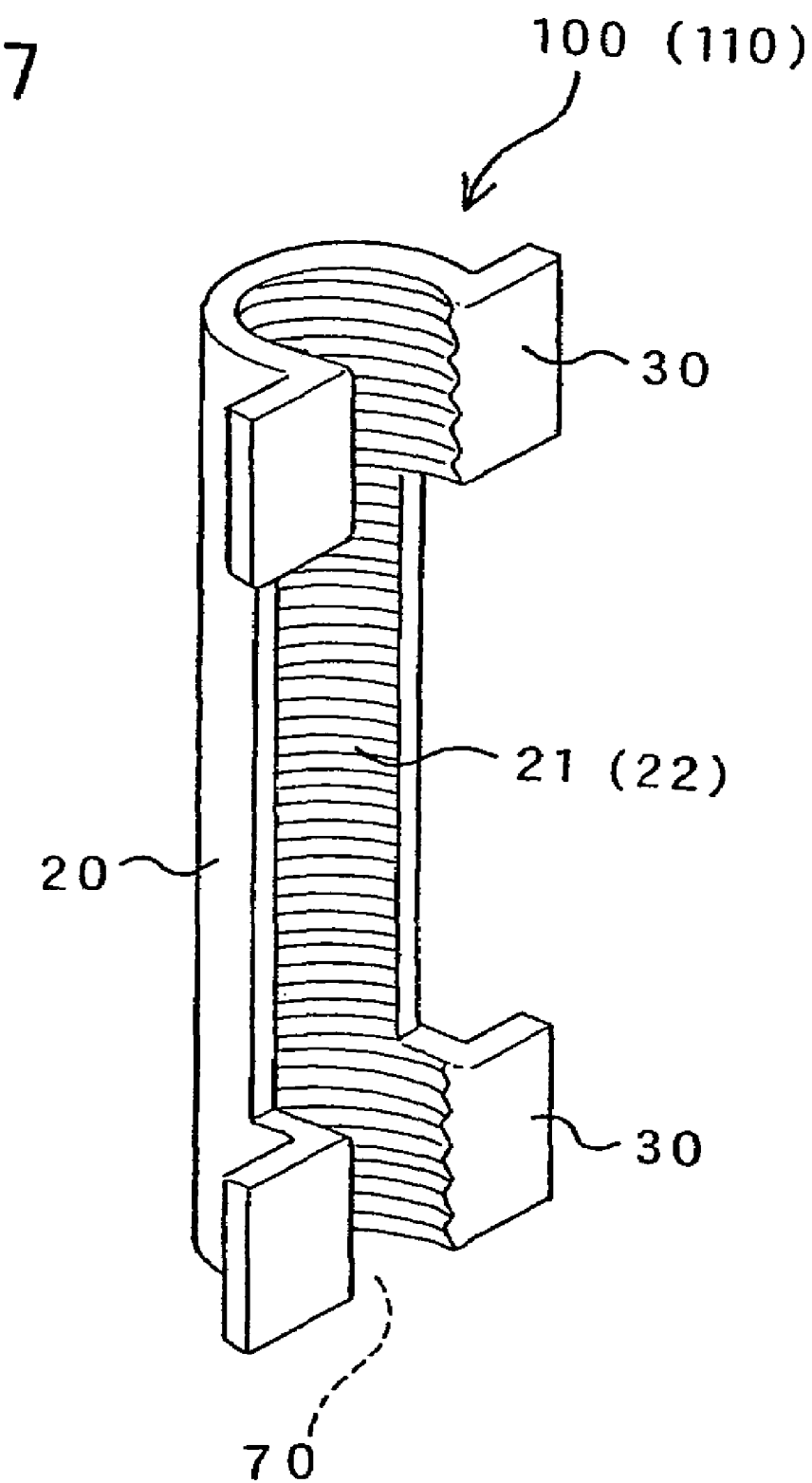
FIG. 17 is a view showing from an upper side a mounting body 100 (a nut body 110) in which a pair of adjacent portions 30 are provided in both ends of an engagement portion 20 in accordance with a long size so as to stand face to face with each other.

FIG. 17 shows a mounting body 100 in accordance with embodiment 3. The mounting body 100 of the present embodiment is structured as a nut body 110. The nut body 110 has an engagement portion 20, adjacent portions 30 and an opening portion 70. Since the adjacent portions 30 and the opening portion 70 in the constituting elements are already described with respect to embodiment 1, a description thereof is omitted by attaching the same reference numerals to the drawings.

The nut body 110 of the present embodiment is provided with an engagement portion 20 in accordance with a long size, and is structured such that a pair of adjacent portions 30 in accordance with a short size are provided in both ends of the engagement portion 20 so as to stand face to face.

Since the engagement projection 21 (the groove 22) is provided in a protruding manner on an inner side of the engagement portion 20 all along an entire length, the engagement projection 21 (the groove 22) is engaged with a lot of outer threads in the bolt body, so that it is possible to more securely prevent a displacement which may be generated in an axial direction of the bolt body.

Further, since the adjacent portions 30 provided in the leading end of the engagement portion 20 are formed short, it is possible to easily clamp with a tool to plastically deform the engagement portion 20 in accordance with the long size mentioned above.

The nut body 110 of the present embodiment may be structured, as described in embodiment 2 mentioned above, such that the deviation portion 40 or the like is provided so as to generate the deviation preventing effect.

EMBODIMENT 4

Figure 18:
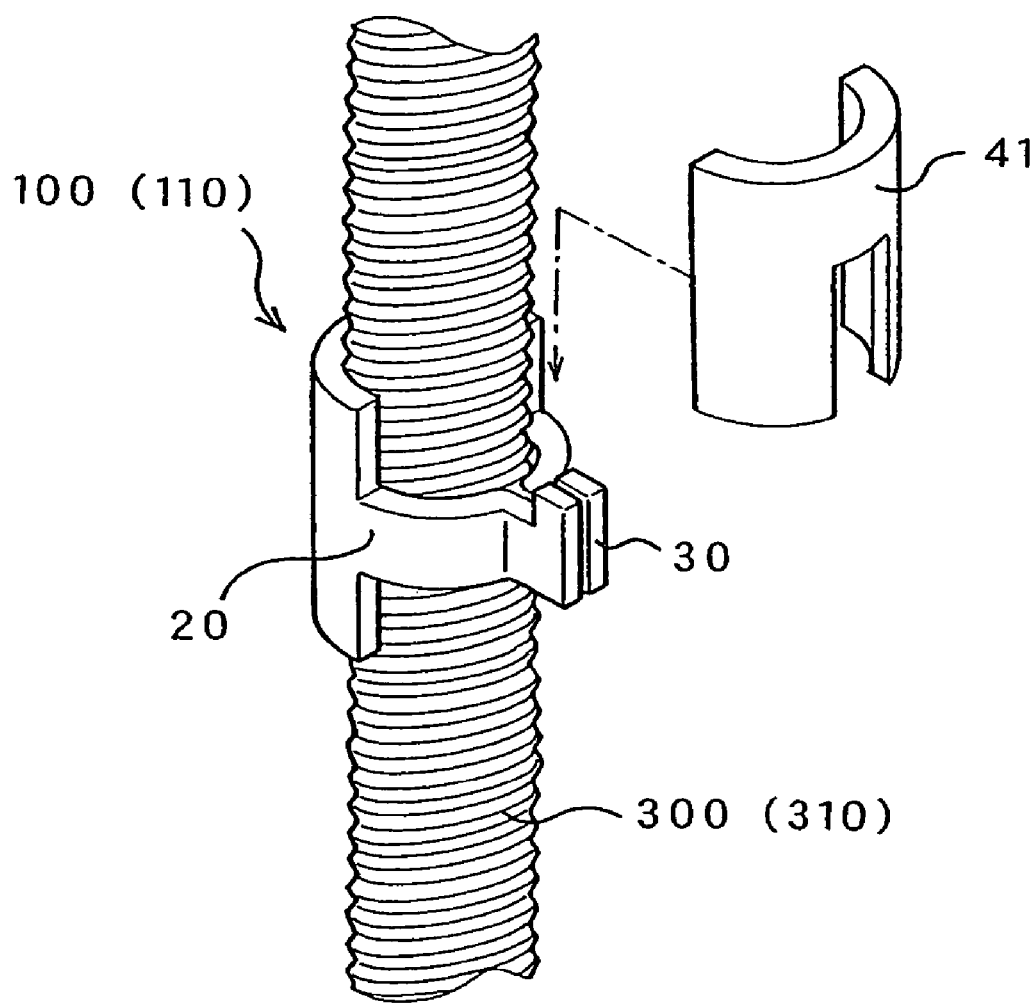
FIG. 18 is a view showing from an upper side a state of mounting a mounting body 100 (a nut body 110) in which a pair of adjacent portions 30 are provided in an intermediate portion of the engagement portion 20 in accordance with a long size so as to stand face to face with each other, to a bolt body, and mounting the deviation preventing member 41 in accordance with the independent member.

FIG. 18 shows a mounting body 100 in accordance with embodiment 4. The mounting body 100 in the present embodiment is structured as a nut body 110. The nut body 110 has an engagement portion 20, an opening portion 70, adjacent portions 30, and a deviation preventing member 41 preventing the adjacent portions 30 from being deviated from each other. Since the engagement portion 20, the opening portion 70 (not shown), the adjacent portions 30 and the deviation preventing member 41 in the constituting elements are already described with respect to embodiments 1 and 2, a description thereof will be omitted by attaching the same reference numerals to the drawings.

The nut body 110 of the present embodiment is provided with the engagement portion 20 in accordance with the long size, and is structured such that a pair of adjacent portions 30 are provided in an intermediate portion of the engagement portion 20 so as to stand face to face with each other. Since the engagement projection 21 (the groove 22) is provided in a protruding manner on the inner side of the engagement portion 20 all along the entire length, the engagement projection 21 (the groove 22) is engaged with a lot of outer threads in the bolt body, so that it is possible to more securely prevent a displacement which may be generated in the axial direction of the bolt body.

Further, in the nut body 110 of the present embodiment, since the adjacent portion 30 is provided only in one position, in a center of the engagement portion 20 in a longitudinal direction, it is possible to plastically deform the engagement portion 20 all along an entire length by clamping the one adjacent portion with the pinching tool P. Further, even in the event that the engagement portion 20 is operated so as to return to a shape before being plastically deformed (that is, such that the adjacent portion 30 is expanded), a pair of adjacent portions 30 that are relatively moved close to each other are pinched by the deviation preventing member 41, so that it is possible to securely prevent a pair of adjacent portions 30 from being again expanded.

Figure 19:
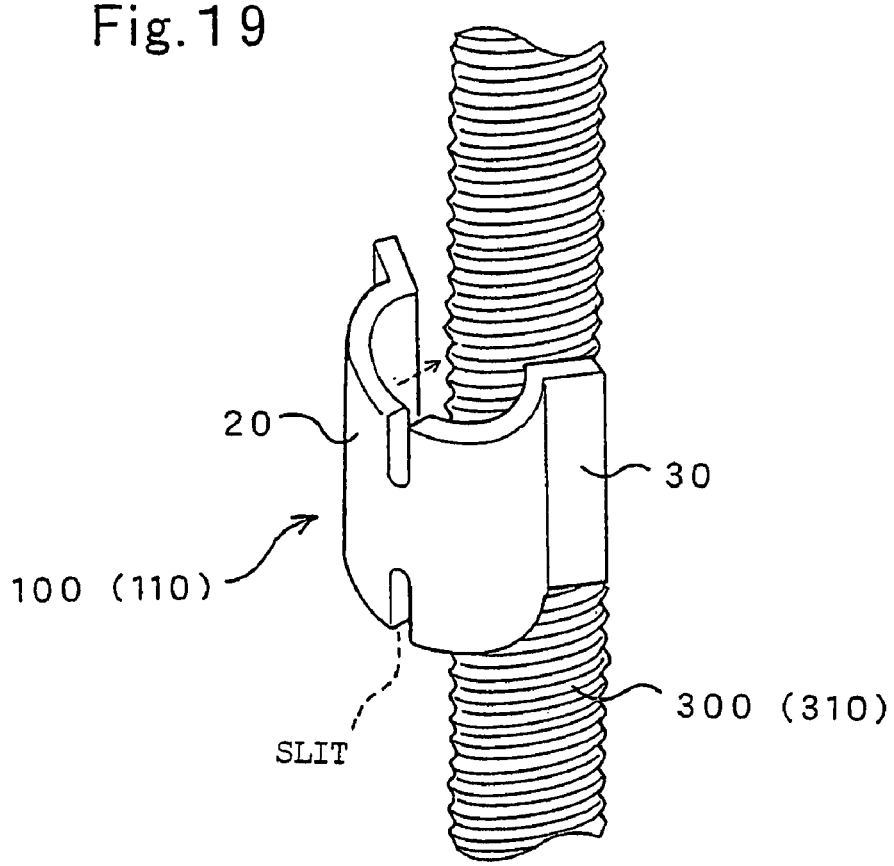
FIG. 19 is a view showing from an upper side a state of mounting a mounting body 100 (a nut body 110) in which a pair of adjacent portions 30 are provided in a leading end portion of the engagement portion 20 in accordance with a long size so as to stand face to face with each other and a slit is formed in an intermediate portion of the engagement portion 20, to a bolt body.

The engagement projection 21 may not be provided in a protruding manner in an inner side of a band-shaped portion (narrow portion) in accordance with the engagement portion 20 in which a pair of adjacent portions 30 are formed (refer to FIG. 19). In other words, if an engagement projection 21 is provided in a protruding manner in an arc-shaped portion (an upper half circle portion) shown in FIG. 25, it is possible to mount the nut body 100 to the bolt body 300 by plastically deforming the engagement portion 20 in accordance with the band-shaped portion so as to clamp the engagement portion 20, even when the engagement projection 21 is not provided in a protruding manner in the other portions.

EMBODIMENT 5

FIG. 19 shows a mounting body 100 of embodiment 5. The mounting body 100 in accordance with the present embodiment is structured as a nut body 110. The nut body 110 has an engagement portion 20, an opening portion 70, adjacent portions 30 and a slit 41. Since the engagement portion 20, the opening portion 70 (not shown) and the adjacent portions 30 in the constituting elements are already described with respect to embodiments 1 and 2, the description thereof is omitted by attaching the same reference numerals to the drawings.

The nut body 110 of the present embodiment is structured such that a pair of adjacent portions 30 are provided in a protruding manner in the leading end portion of the engagement portion 20 so as to stand face to face with each other, and an engagement projection 21 (a groove 22) is provided in a protruding manner on an inner side of the engagement portion 20 all along an entire length thereof. Accordingly, since the engagement projection 21 (the groove 22) is engaged with a lot of outer threads in the bolt body, it is possible to prevent a displacement which may be generated in the axial direction of the bolt body.

Further, a slit is formed in a back surface of the nut body 110 (that is, an intermediate portion of the engagement portions 20 which stand face to face with each other). Accordingly, since it is possible to substantially shorten a dimension in a longitudinal direction in the plastically deformed engagement portion 20, it is possible to plastically deform the engagement portion 20 in accordance with the long size even by a small amount of work. This is particularly effective in the case that the engagement portion 20 is formed by the long size.

EMBODIMENT 6

FIG. 3 shows a mounting body 100 in accordance with embodiment 6. The mounting body 100 in the present embodiment is structured as a fixing device for attaching the secondary mounting body 200 to the bolt body. The fixing device has an engagement portion 20, an opening portion 70, adjacent portion 30, and a holding portion 50 holding the secondary mounting body 200. Since the engagement portion 20, the opening portion 70 and the adjacent portions 30 in the constituting elements are already described in with respect to embodiment 1, a description thereof is omitted by attaching the same reference numerals to the drawings.

The holding portion 50 holds the secondary mounting body 200, and is structured such that the secondary mounting body 200 can be mounted to the bolt body 300 by mounting the mounting body 100 (the fixing device) of the present embodiment to the bolt body 300 in a state in which the secondary mounting body 200 is held by the holding portion 50.

Figure 31:
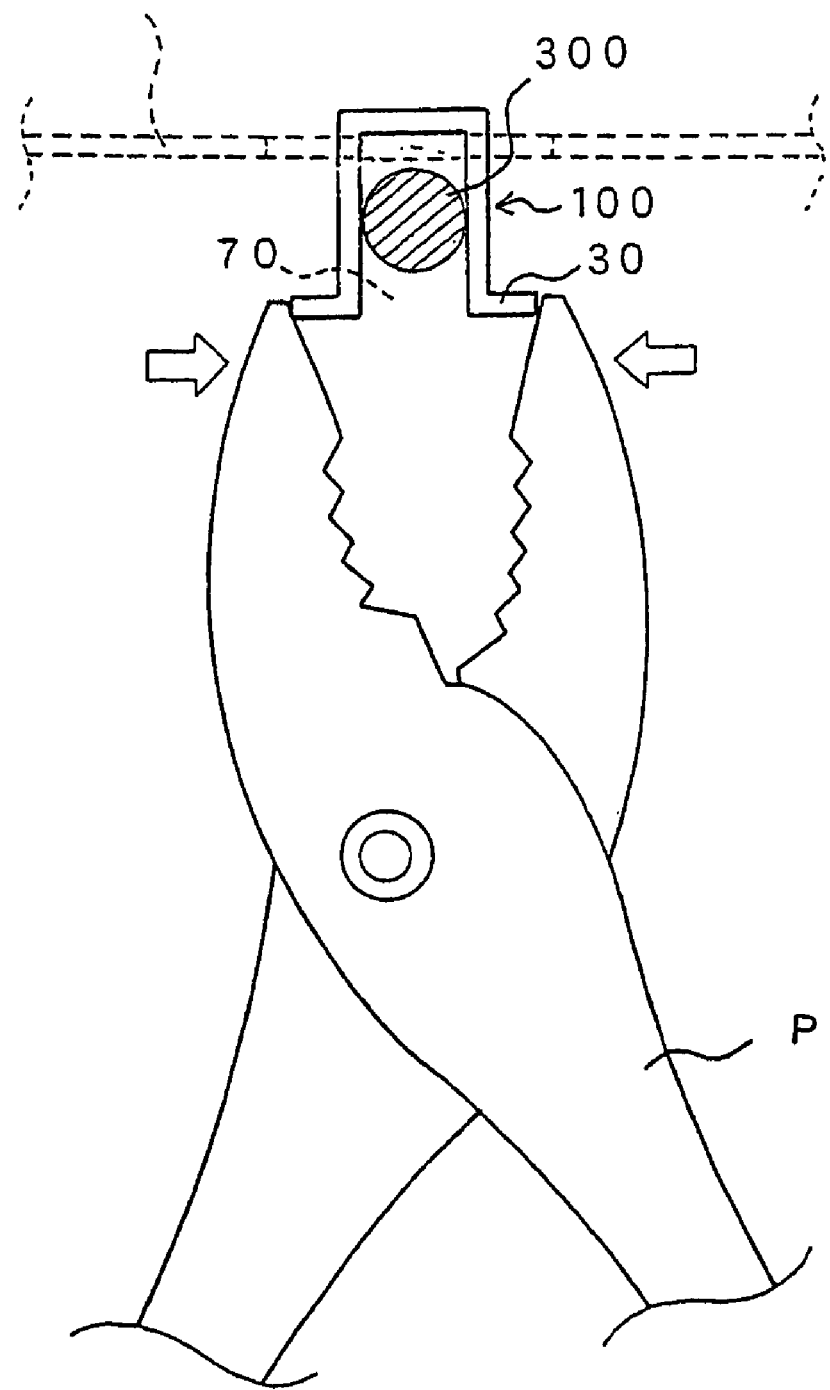
FIG. 31 is a first view showing a process of plastically deforming the engagement portion 20 of the mounting body 100 (the nut body 110), in a state in which a secondary mounting body 200 shown by a broken line is interposed between the mounting body 100 (the nut body 110) of the present invention and the bolt body 300 in accordance with the mounted subject.
Figure 32:
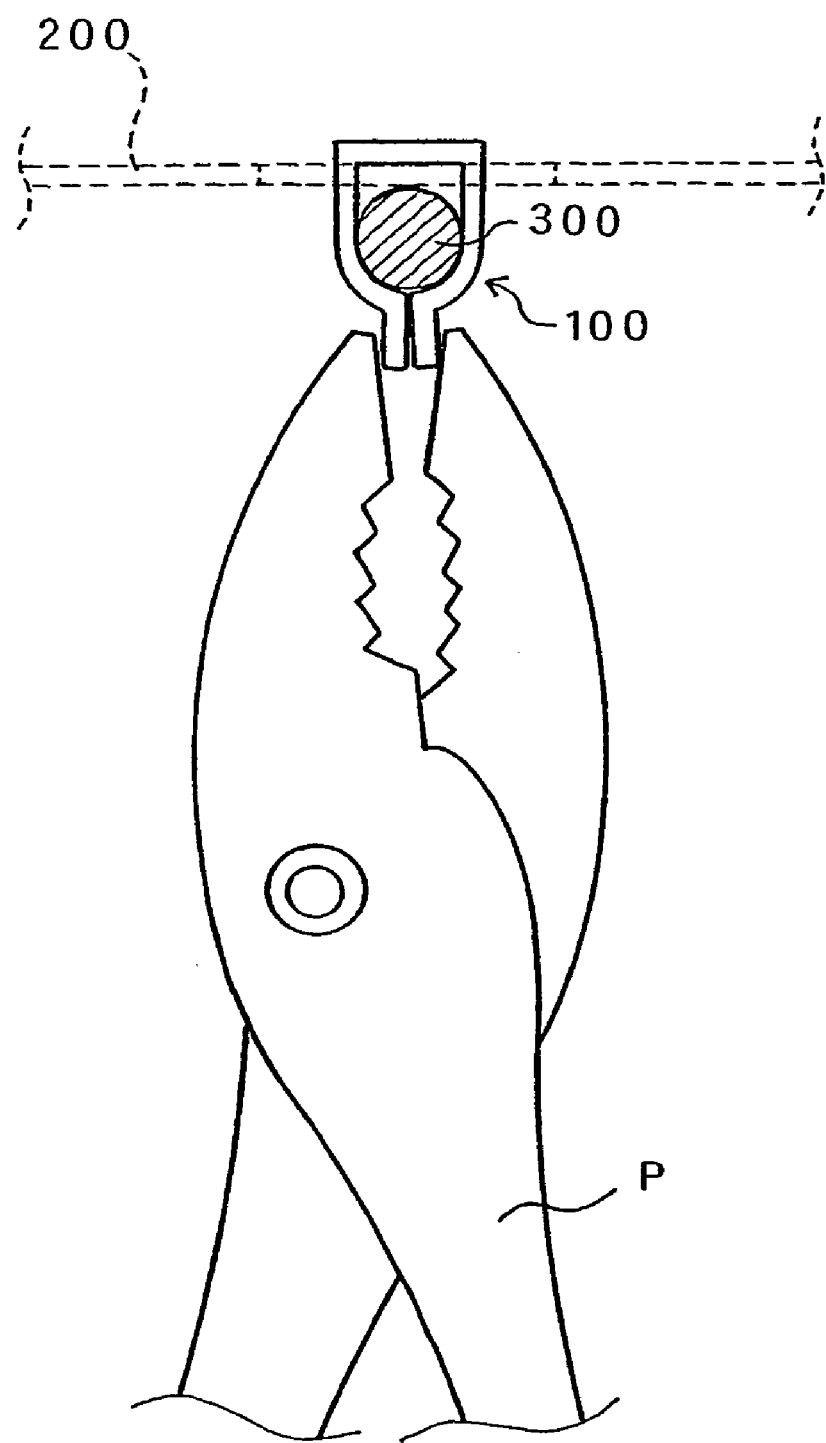
FIG. 32 is a second view showing a process in FIG. 31.
Figure 33:
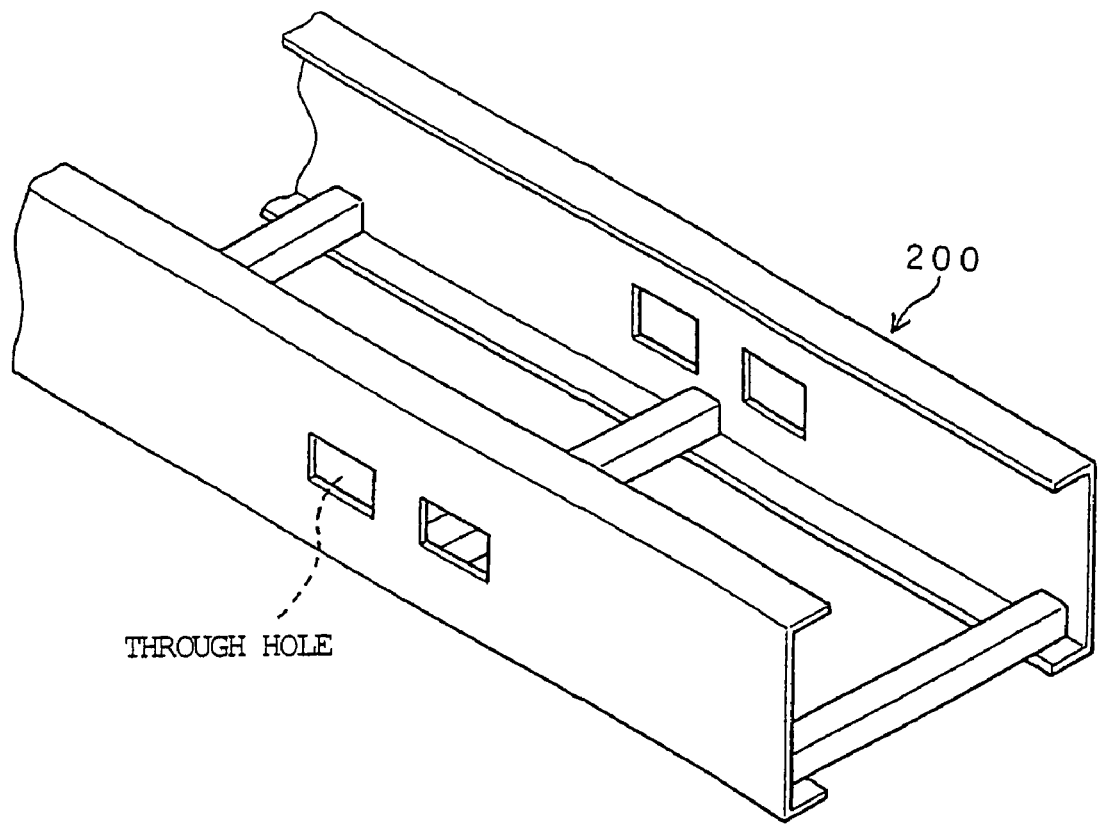
FIG. 33 is a view showing from an upper side a wiring material and piping material receiving device in accordance with the secondary mounting body 200, in the present invention.

In the present embodiment, as shown in FIG. 3, the portion between the pair of engagement portions 20, provided so as to stand face to face with each other, is set as the holding portion 50, the secondary mounting body 200 is clamped between the holding portion 50 and the bolt body 300, and the secondary mounting body 200 is mounted to the bolt body 300. In this case, in the secondary mounting body 200 mentioned above, after piercing a pair of through holes in the secondary mounting body 200, inserting the engagement portion 20 of the mounting body 100 (the fixing device) provided with the holding portion 50 into a pair of through holes, and applying the engagement portion 20 to the outer surface of the bolt body 300 from the side portion, as shown in FIG. 33 (the wiring material and piping material receiving device 120) or FIG. 36 (the wiring material and piping material box 130), the plastic deformation is applied as shown in FIGS. 31 and 32. At this time, since a portion between a pair of through holes in the secondary mounting body 200 is clamped between the holding portion 50 and the bolt body 300, it is possible to mount the secondary mounting body 200 to the bolt body 300.

In this case, the mounting body 100 (the fixing device) of the present embodiment may be structured, as described in embodiments 1 and 2 mentioned above, such that a spirally inscribed surface shaped engagement projection 21 is provided in a protruding manner by arranging the grooves 22 in parallel, or the deviation preventing effect is generated by arranging the deviation preventing portion 40 or the like.

EMBODIMENT 7

Figure 20:
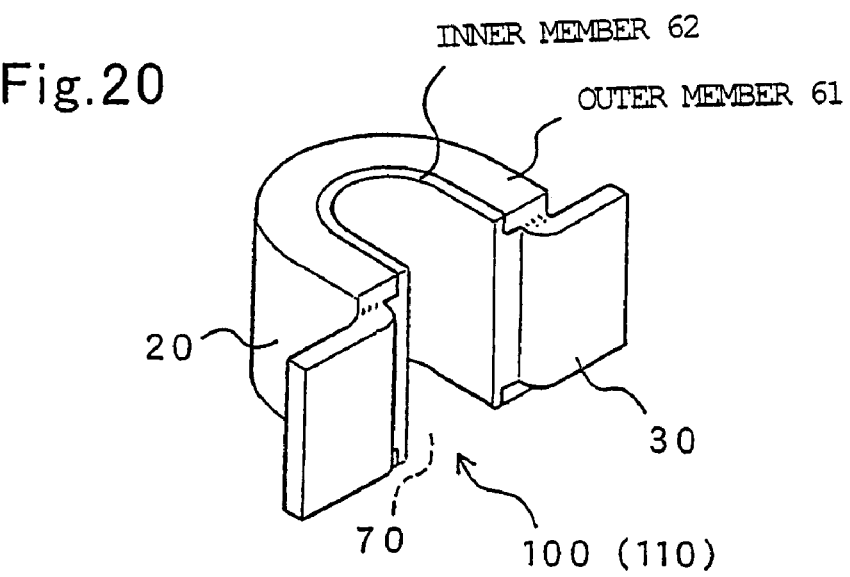
FIG. 20 is a view showing from an upper side a mounting body 100 (a nut body 110) provided with a double-structured engagement portion 20 having an outer member 61 and an inner member 62.
Figure 21:
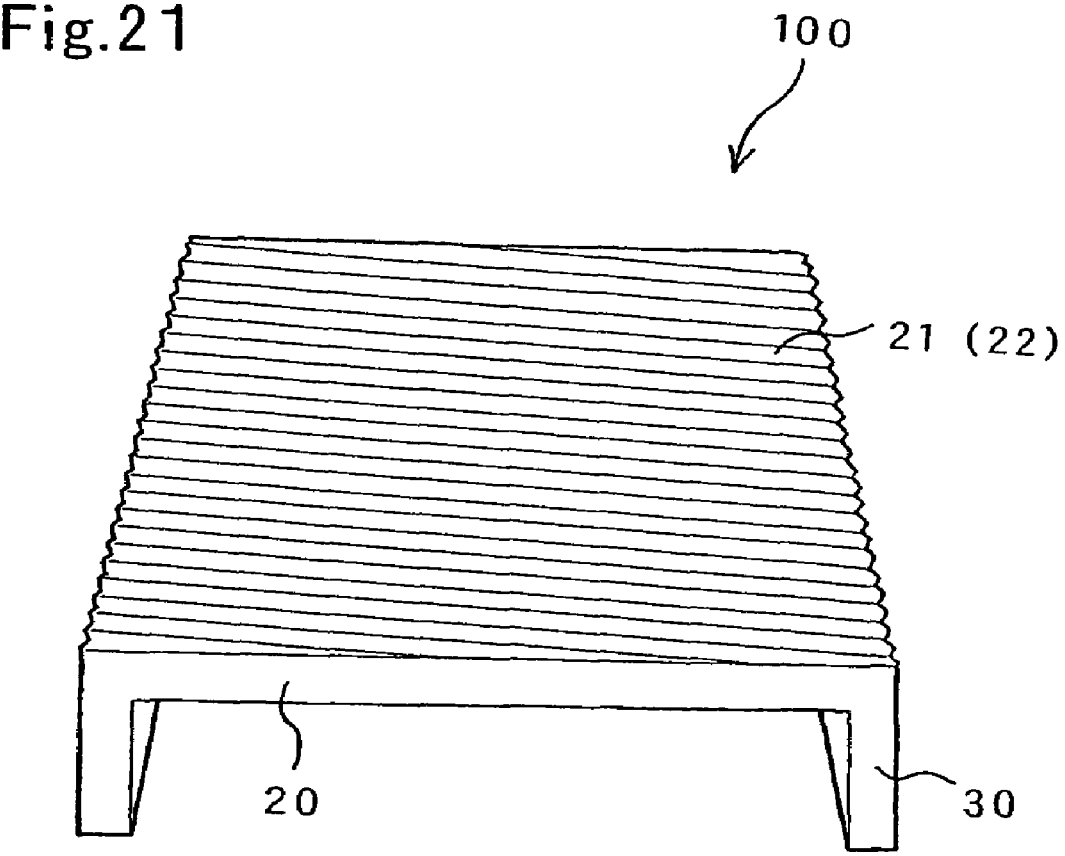
FIG. 21 is a view showing from a front upper side a steel plate in which both ends are pushed and bent to a lower side and a spirally inscribed surface is formed on a top surface.
Figure 22:
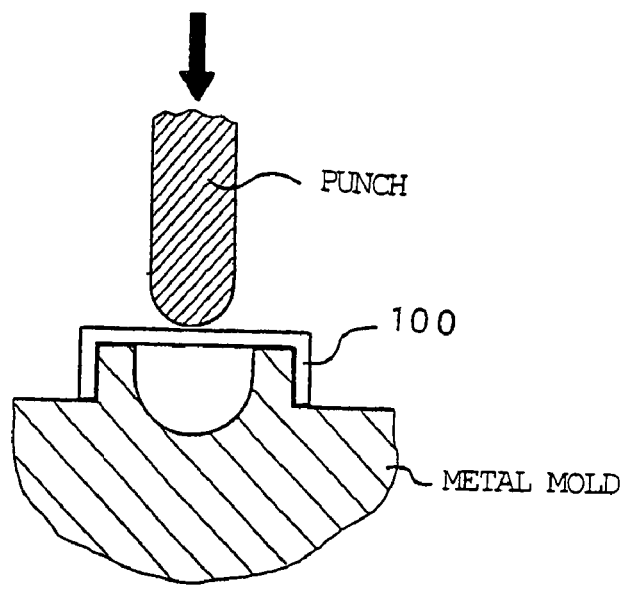
FIG. 22 is a first view showing a process of press molding at a time of manufacturing the mounting body 100 (the nut body 110) of the present invention.
Figure 23:
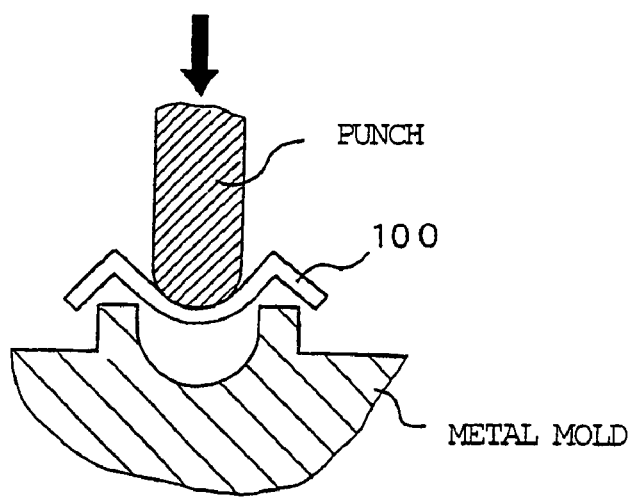
FIG. 23 is a second view showing a process in FIG. 22.
Figure 24:
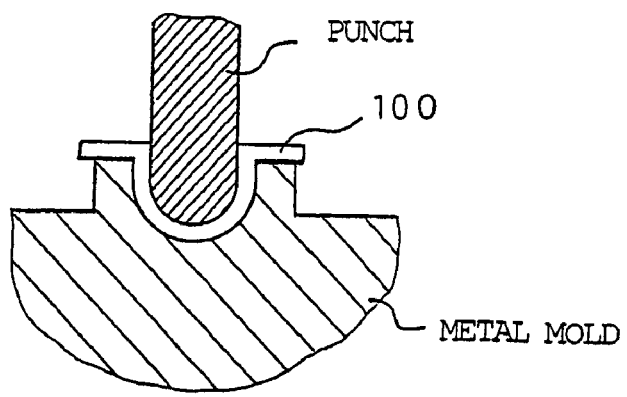
FIG. 24 is a third view showing a process in FIG. 22.

FIG. 20 shows a mounting body 100 in accordance with embodiment 7. The mounting body 100 of the present embodiment is structured as a nut body 110. The nut body 110 has an engagement portion 20, adjacent portions 30 and an opening portion 70. Since the adjacent portions 30 and the opening portion 70 in the constituting elements are already described with respect to embodiment 1, a description thereof is omitted by attaching the same reference numerals to the drawings.

The engagement portion 20 in the present embodiment is constituted by a double-structure comprising an outer member 61 and an inner member 62. The outer member 61 is formed by a plastically deformable metal. The inner member 62 is formed by a plastic material represented by a synthetic resin, such as a plastic or the like. The outer member 61 presses the inner member 62 by plastically deforming the metal material structuring the outer member 61. The engagement projection 21 is formed by deformation of the plastic material structuring the inner member 62 along the outer thread 310 of the bolt body 300, and the engagement projection 21 is engaged with the outer thread 310 of the bolt body 300.

The inner member 62 eats into the outer surface of the bolt body 300, whereby a surface in the inner member 62, which is brought into contact with the outer thread 310 of the bolt body 300, is deformed along the outer thread 310 of the bolt body 300. Accordingly, the engagement projection 21 is formed in the surface of the inner member 62 which is brought into contact with the outer thread 310 of the bolt body 300, and the engagement projection 21 is engaged with the outer thread 310 of the bolt body 300.

Further, since the inner member 62 can be optionally deformed along the outer thread 310, the inner member 62 can be engaged with the outer thread 310 at whatever pitch is formed in the outer thread of the bolt body 300 corresponding to the engaged subject. Accordingly, the mounting body 100 of the present embodiment can be mounted to the bolt body 300 which is formed with every outer diameter.

In this case, the nut body 110 in accordance with the present embodiment may be constructed as a structure in which the deviation preventing effect is generated by arranging the deviation preventing portion 40 or the like, as is described in embodiment 6 mentioned above.

EMBODIMENT 8

Figure 29:
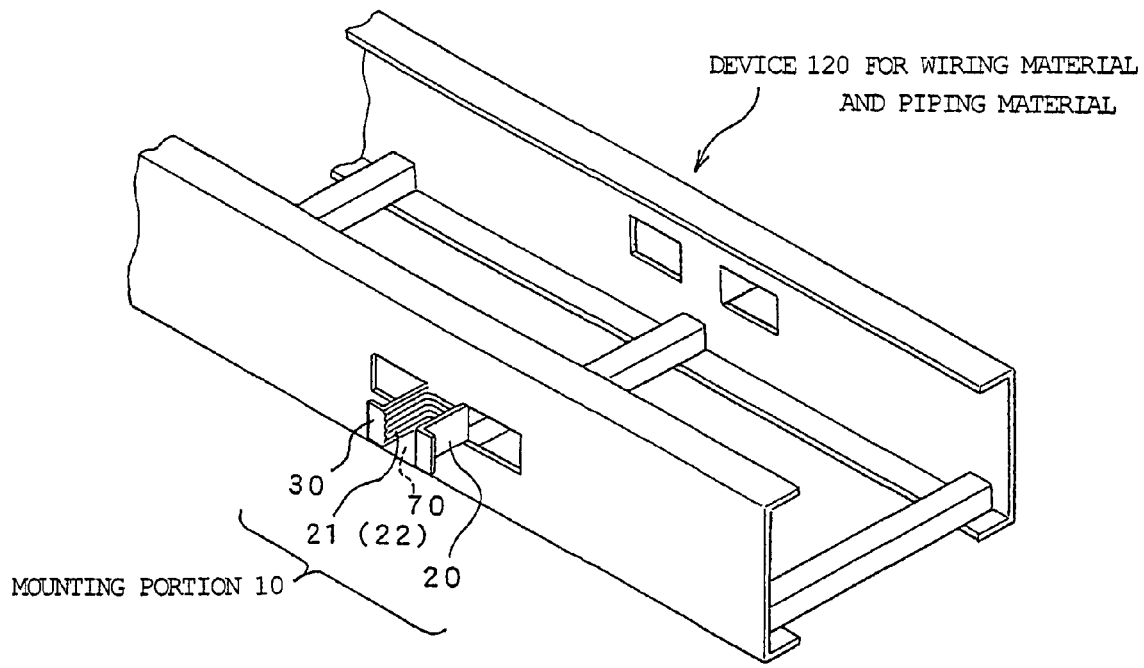
FIG. 29 is a view showing from an upper side a mounting body 100 (a wiring material and piping material receiving device 120) of the present invention.
Figure 30:
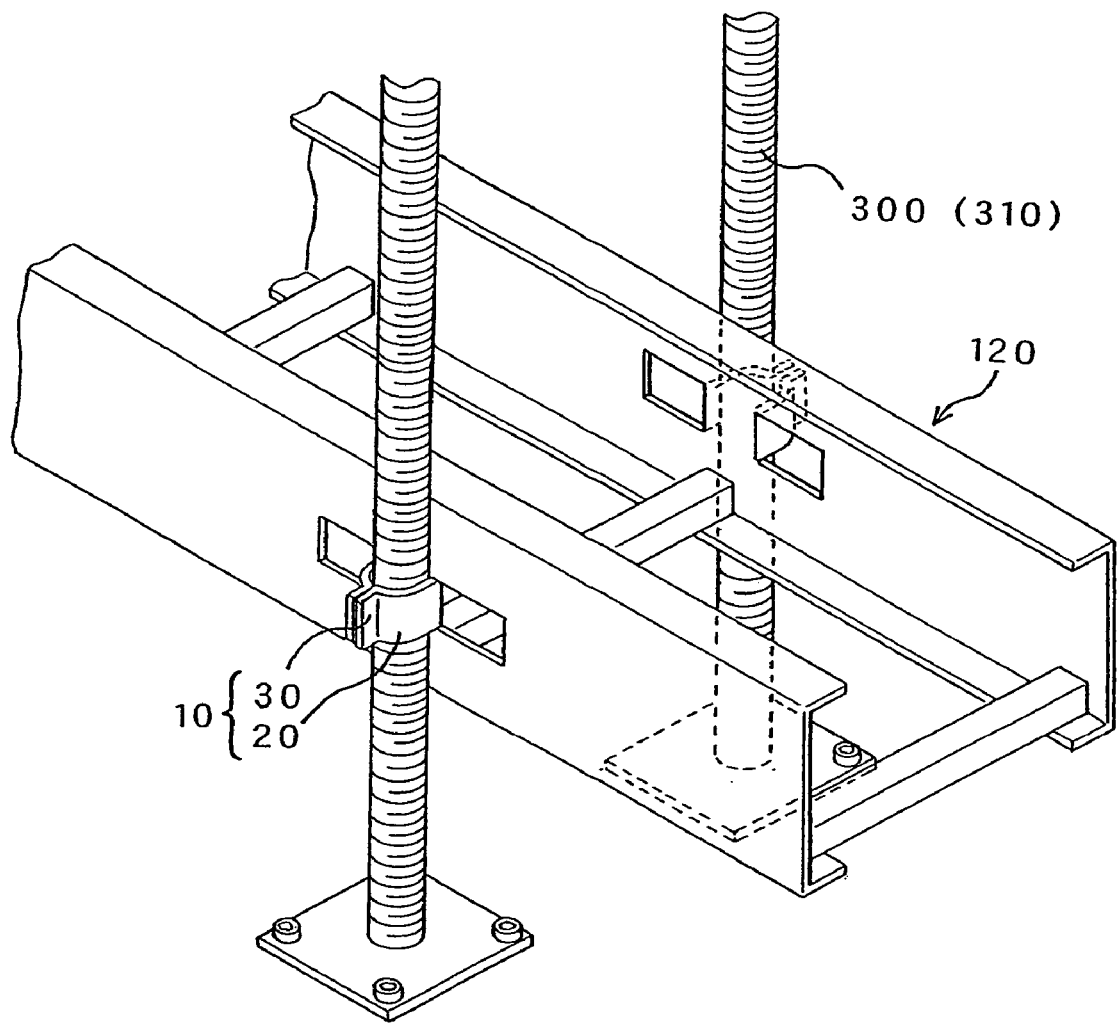
FIG. 30 is a view showing from an upper side a state in which the mounting body 100 (the wiring material and piping material receiving device 120) shown in FIG. 29 is mounted to a bolt body 300 in accordance with a mounted subject.

FIGS. 29 and 30 show mounting body 100 in accordance with embodiment 8. The mounting body 100 of the present embodiment is structured as a wiring material and piping material receiving device 120 provided with the mounting portion 10. The wiring material and piping material receiving device 120 has an engagement portion 20, an opening portion 70 and adjacent portions 30 in the mounting portion 10. Since the engagement portion 20, the opening portion 70, the adjacent portions 30 and the engagement projection 21 provided in a protruding manner in the engagement portion 20 are already described with respect to embodiment 1 through embodiment 7, a description and/or outline thereof is omitted by attaching the same reference numerals to the drawings.

The wiring material and piping material receiving device 120 of the present embodiment is mounted to the bolt body 300 in accordance with the mounted subject by applying the engagement portion 20 in accordance with the mounting portion 10 to the bolt body 300 from a side portion thereof, and plastically deforming the engagement portion 20 as shown in FIGS. 25 and 26.

Figure 34:
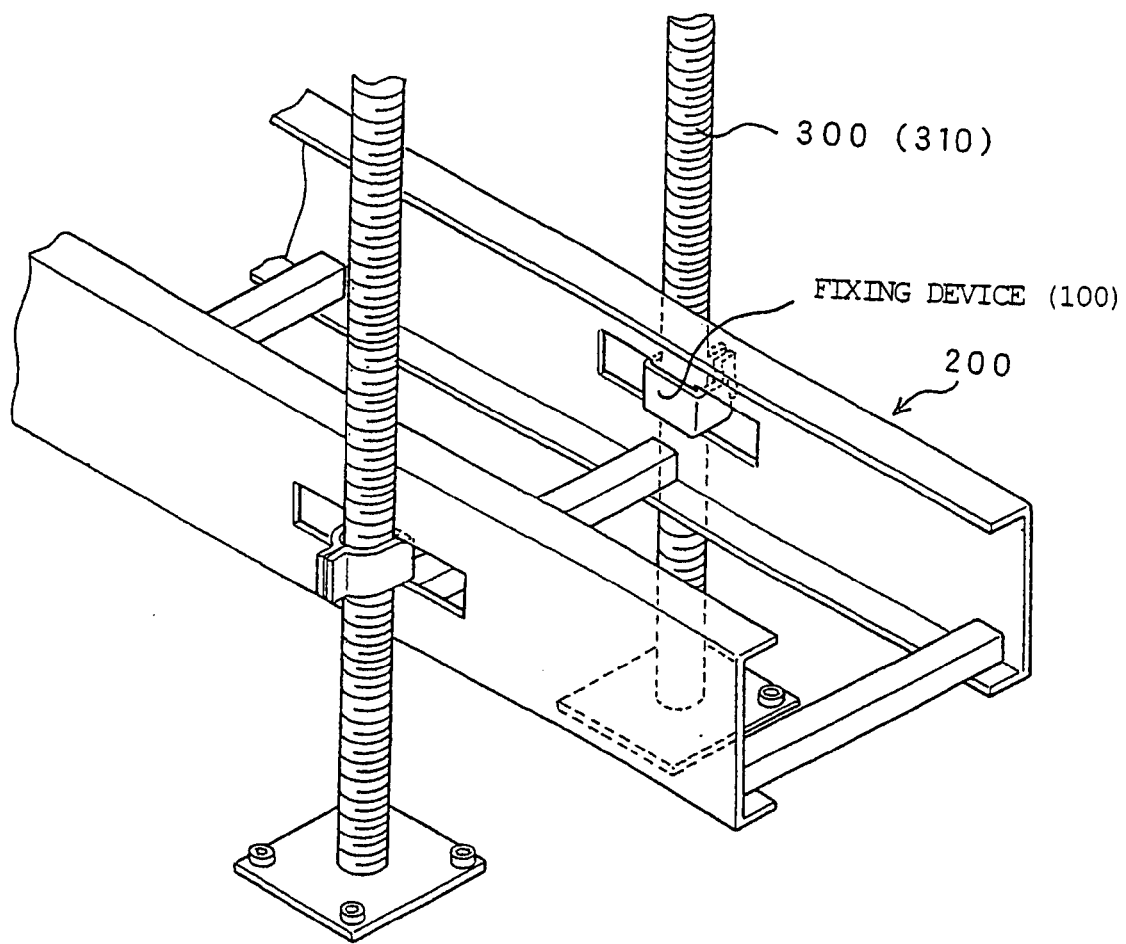
FIG. 34 is a view showing from an upper side a state in which the wiring material and piping material receiving device in accordance with the secondary mounting body 200 shown in FIG. 33 is mounted to the bolt body 300 in accordance with the mounted subject, by pinching the wiring material and piping material receiving device by the mounting body 100 of the present invention.

In the present invention, the structure is not limited to a method of integrally arranging the mounting portion 10 in the receiving device 120 and mounting to the bolt body 300 by the mounting portion 10, as shown in FIG. 29, to mount the wiring material and piping material receiving device to the bolt body 300. In other words, as shown in FIG. 33, the wiring material and piping material receiving device may be structured as a secondary mounting body such that a pair of through holes are pierced in each of the side walls of the receiving device. The engagement portion 20 of the mounting body 100 (the fixing device) shown in FIG. 3 is inserted into a pair of through holes. Further, the engagement portion 20 is mounted to the bolt body 300, as shown in FIG. 34, by plastically deforming the engagement portion 20, as shown in FIGS. 31 and 32, after applying the engagement portion 20 to the outer surface of the bolt body 300 from a side portion. At this time, it is possible to mount the wiring material and piping material receiving device to the bolt body 300 since a portion between the pair of through holes in the wiring material and piping material receiving device, in accordance with the secondary mounting body 200, is clamped between the holding portion 50 and the bolt body 300.

Further, the mounting portion 10 of the receiving device 120 of the present embodiment may be structured, as described in embodiments 1 to 4 mentioned above, such that the spirally inscribed surface shaped engagement projection 21 is provided in a protruding manner by arranging the grooves 22 in parallel. The deviation preventing effect is generated by arranging the deviation preventing portion 40 or the like. Alternatively, the engagement portion 20 in the mounting portion 10 is formed as a double structure.

Further, in the drawings, the structure is made such as to be mounted to the support bolt which is stood by fixing one end to the floor surface. However, the structure may be made such as to be mounted to a hanging bolt which is suspended from a ceiling in a building.

EMBODIMENT 9

Figure 35:
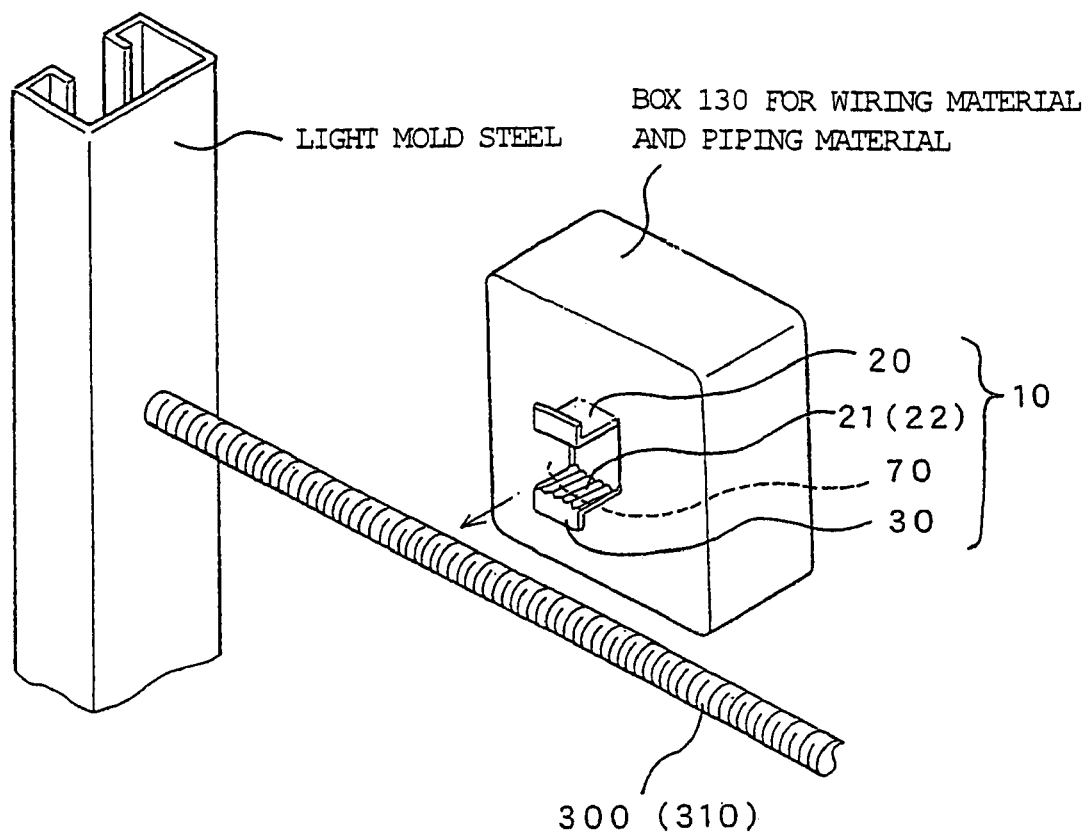
FIG. 35 is a view showing from an upper side a mounting body 100 (a wiring material and piping material box 130) of the present invention.

FIG. 35 shows a mounting body 100 in accordance with embodiment 9. The mounting body 100 of the present embodiment is structured as a wiring material and piping material box 130 provided with the mounting portion 10. The wiring material and piping material box 130 has an engagement portion 20, an opening portion 70 and adjacent portions 30 in the mounting portion 10. Since the engagement portion 20, the opening portion 70, the adjacent portions 30, and engagement projection 21 provided in a protruding manner in the engagement portion 20 on the constituting elements are already described with respect to embodiment 1 the embodiment 7, a description and/or outline thereof is omitted by attaching the same reference numerals to the drawings.

The wiring material and piping material box 130 of the present embodiment is mounted to the bolt body 300 in accordance with the mounted subject by applying the engagement portion 20 in accordance with the mounting portion 10 to the bolt body 300 from a side portion thereof and plastically deforming the engagement portion 20 as shown in FIGS. 25 and 26.

Figure 36:
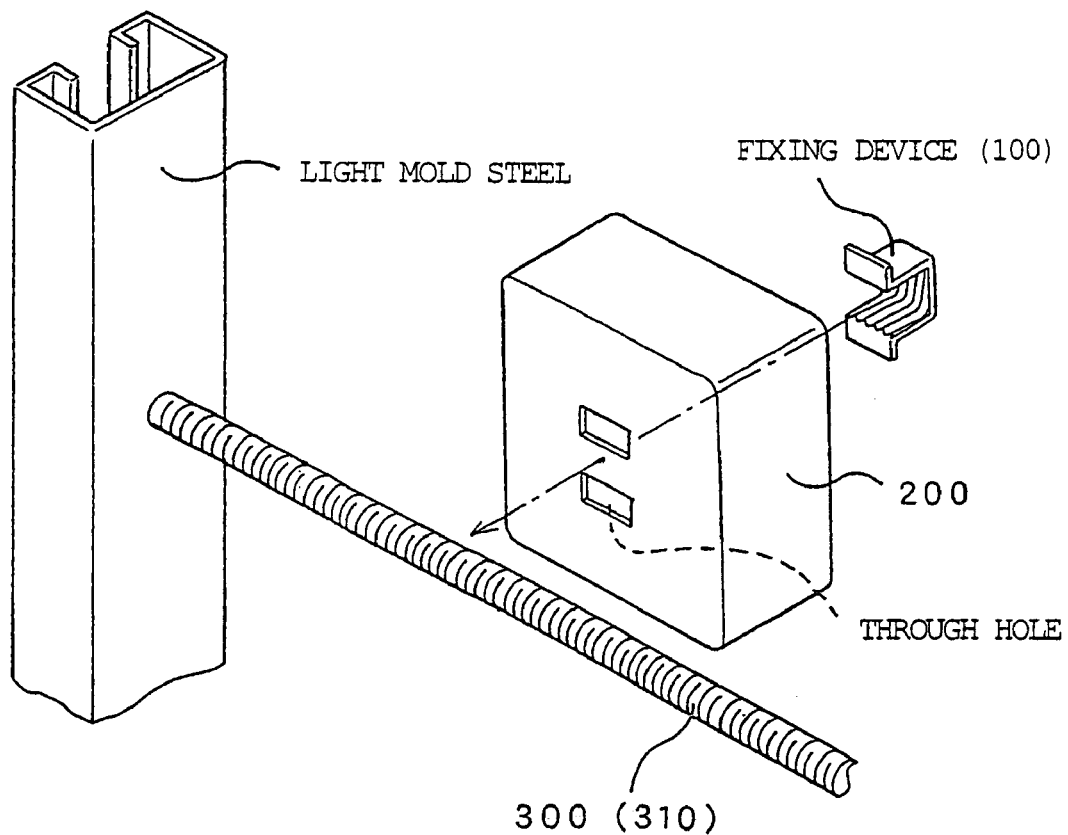
FIG. 36 is a view showing from an upper side a state in which the mounting body 100 of the present invention is mounted to the bolt body 300 in accordance with the mounted subject by inserting the mounting body 100 of the present invention to a pair of through holes of the wiring material and piping material box in accordance with the secondary mounting body 200, in the present invention.

In the present invention, in order to mount the wiring material and piping material box to the bolt body 300, the structure is not limited to a method of integrally arranging the mounting portion 10 in the box and mounting to the bolt body 300 by the mounting portion 10, as shown in FIG. 35. As shown in FIG. 36, the wiring material and piping material box may be structured as a secondary mounting body such that a pair of through holes are pierced in a bottom surface of the box. The engagement portion 20 of the mounting body 100 (the fixing device) shown in FIG. 3 is inserted into a pair of through holes. Further, the engagement portion 20 is plastically deformed, as shown in FIGS. 31 and 32, after the engagement portion 20 is applied to the outer surface of the bolt body 300 from a side portion. At this time, since a portion between the pair of through holes in the wiring material and piping material box in accordance with the secondary mounting body 200 is clamped between the holding portion 50 and the bolt body 300, it is possible to mount the wiring material and piping material box to the bolt body 300.

Further, the mounting portion 10 of the box 130 of the present embodiment may be structured, as described in embodiments 1 to 4 mentioned above, such that the spirally inscribed surface shaped engagement projection 21 is provided in a protruding manner by arranging the grooves 22 in parallel. The deviation preventing effect is generated by arranging the deviation preventing portion 40 or the like. Alternatively, the engagement portion 20 in the mounting portion 10 is formed as a double structure.

EMBODIMENT 10

Figure 37:
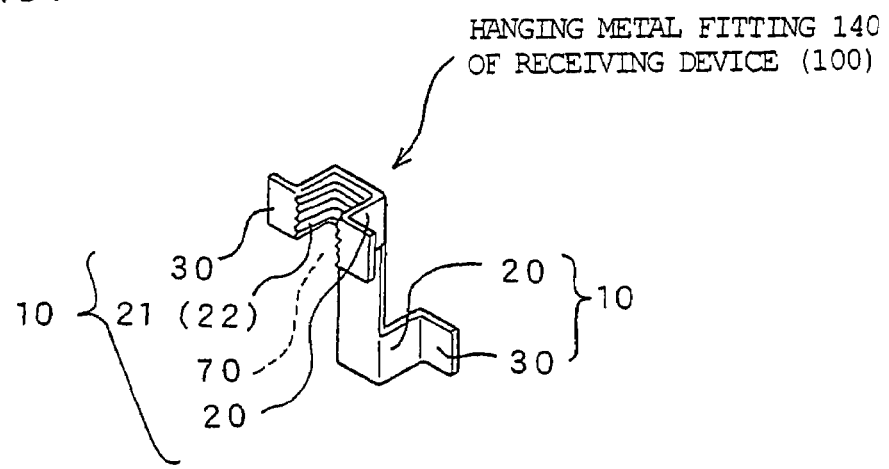
FIG. 37 is a view showing from an upper side a mounting body 100 (a hanging metal fitting 140 of the receiving device 120) of the present invention.
Figure 38:
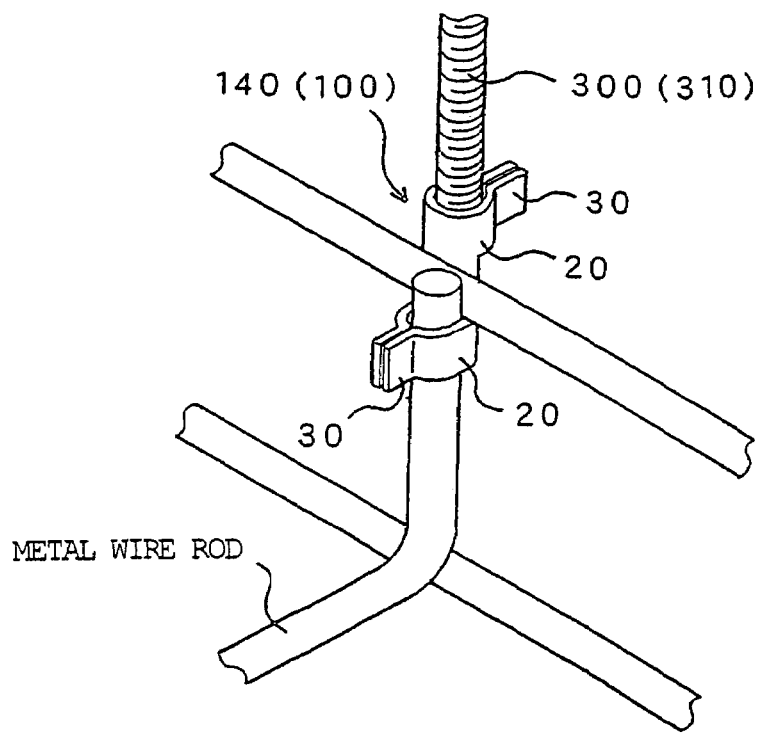
FIG. 38 is a view showing from an upper side a state in which the mounting body 100 (the hanging metal fitting 140 of the receiving device 120) shown in FIG. 37 is mounted to the bolt body 300 in accordance with the mounted subject and a metal wire rod constituting the receiving device 120.

FIGS. 37 and 38 show a mounting body 100 of embodiment 10. The mounting body 100 in accordance with the present embodiment is structured as a hanging metal fitting 140 of the receiving device 120. The hanging metal fitting 140 of the receiving device 120 has an engagement portion 20, an opening portion 70 and adjacent portions 30 in the mounting portion 10 thereof. Since the engagement portion 20, the opening portion 70, the adjacent portions 30 and the engagement projection 21 provided in a protruding manner in the engagement portion 20 in the constituting elements are already described with respect to embodiment 1 to embodiment 7, a description thereof is omitted by attaching the same reference numerals to the drawings.

The hanging metal fitting 140 of the present embodiment is provided with mounting portions 10 in both ends thereof, as shown in FIG. 37. In both mounting portions 10, the mounting portion 10, on a side connected to the bolt body 300, is provided with the engagement portion 20 having a pair of adjacent portions 30 in a leading end, and the engagement projection 21 is provided in a protruding manner in the engagement portion 20.

On the other hand, the mounting portion 10 in a side connected to the receiving device 120 is provided with the engagement projection 21, and has only a plastically deformable engagement portion 20 provided with a pair of adjacent portions 30 in a leading end.

Further, in order to connect the receiving device 120 to the bolt body 300 by the hanging metal fitting 140, mounting to the bolt body 300 and the metal wire rod is completed by moving forward the bolt body 300 or the metal wire rod constituting the receiving device 120 to each of the mounting portions 10 from a side portion as shown in FIG. 38, and thereafter plastically deforming each of the engagement portions 20 as shown in FIGS. 25 and 26.

The mounting portion 10 of the box 130 in accordance with the present embodiment may be structured, as described in embodiments 1 to 4 mentioned above, such that the spirally inscribed surface shaped engagement projection 21 is provided in a protruding manner by arranging the grooves 22 in parallel. The deviation preventing effect is generated by arranging the deviation preventing portion 40 or the like. Alternatively, the engagement portion 20 in the mounting portion 10 is formed as a double structure.

EMBODIMENT 11

Figure 39:
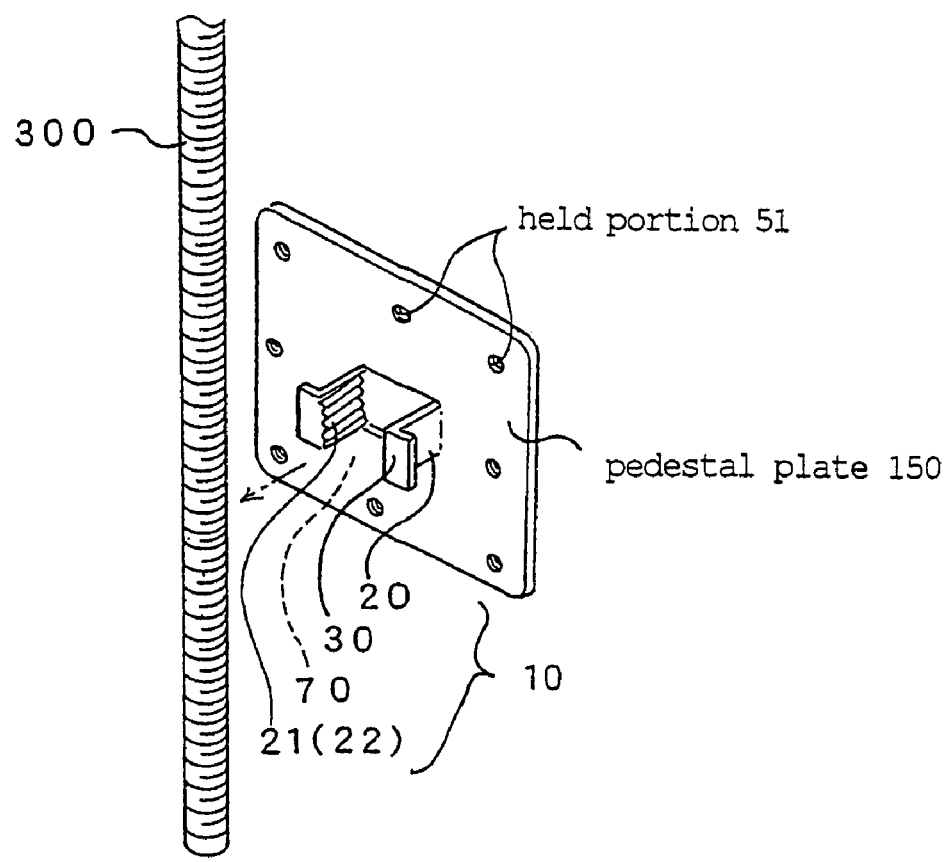
FIG. 39 is a view showing from an upper side a mounting body 100 (a pedestal plate 150) of the present invention.
Figure 40:
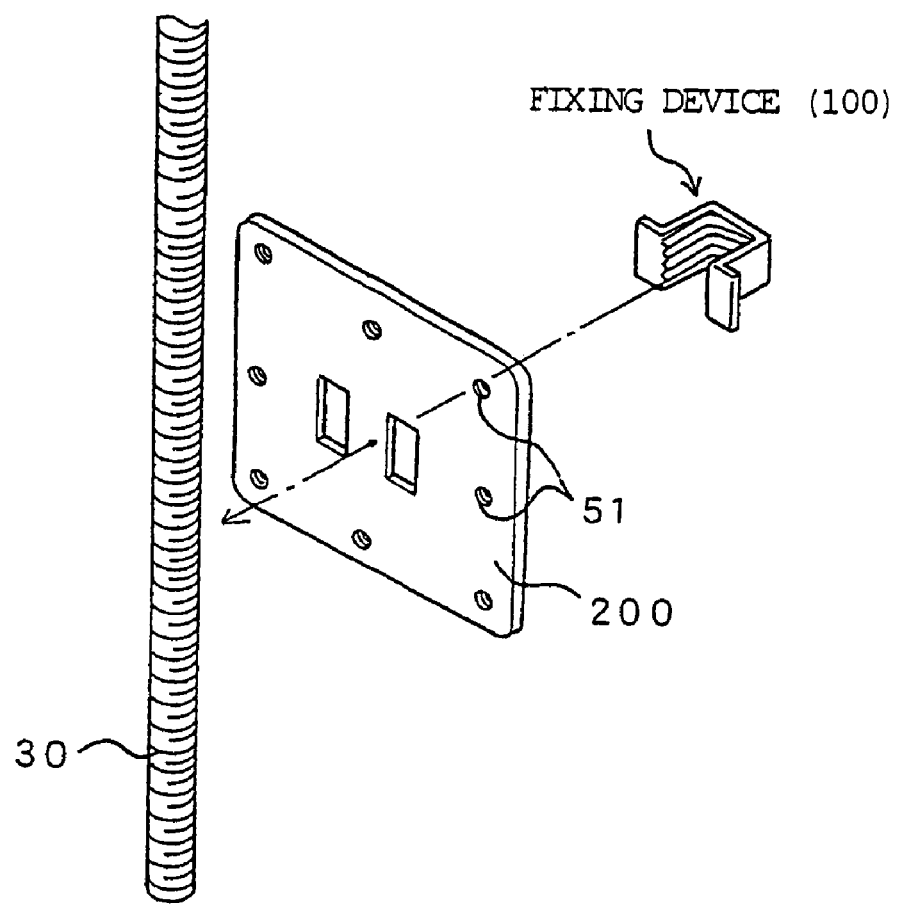
FIG. 40 is a view showing from an upper side a state in which the mounting body 100 of the present invention is mounted to the bolt body 300 in accordance with the mounted subject, by inserting the mounting body 100 of the present invention to a pair of through holes of the pedestal plate in accordance with the secondary mounting body 200, in the present invention.
Figure 41:
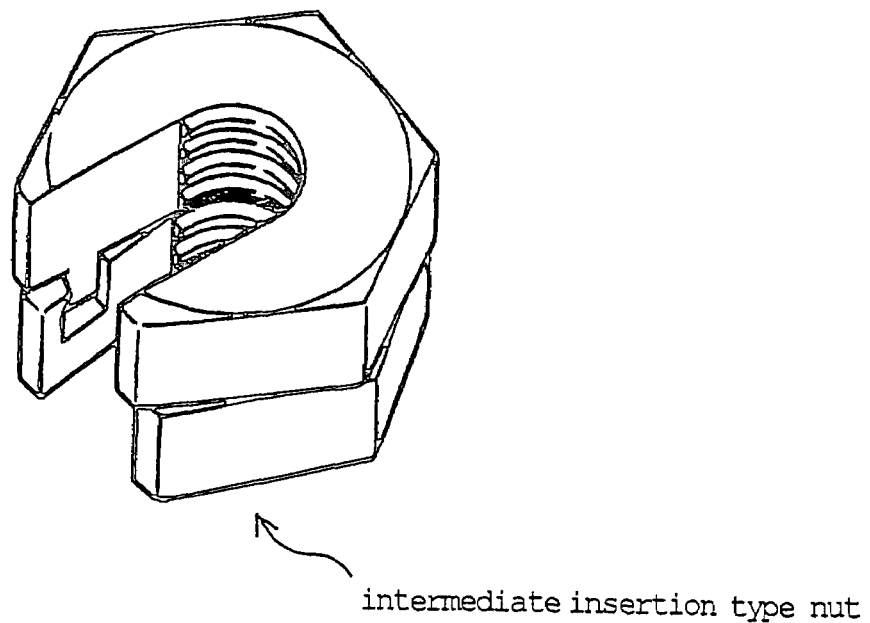
FIG. 41 is a view showing from an upper side an intermediate insertion type nut in accordance with a conventional art.
Figure 42:
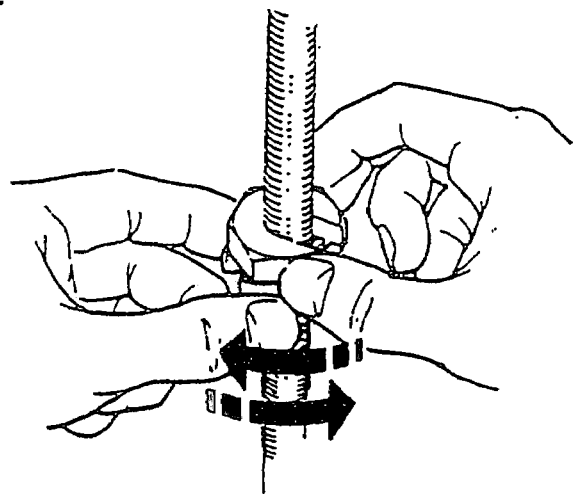
FIG. 42 is a view showing a process at a time of mounting the intermediate insertion type nut shown in FIG. 41 to the bolt body 300.
Figure 43:
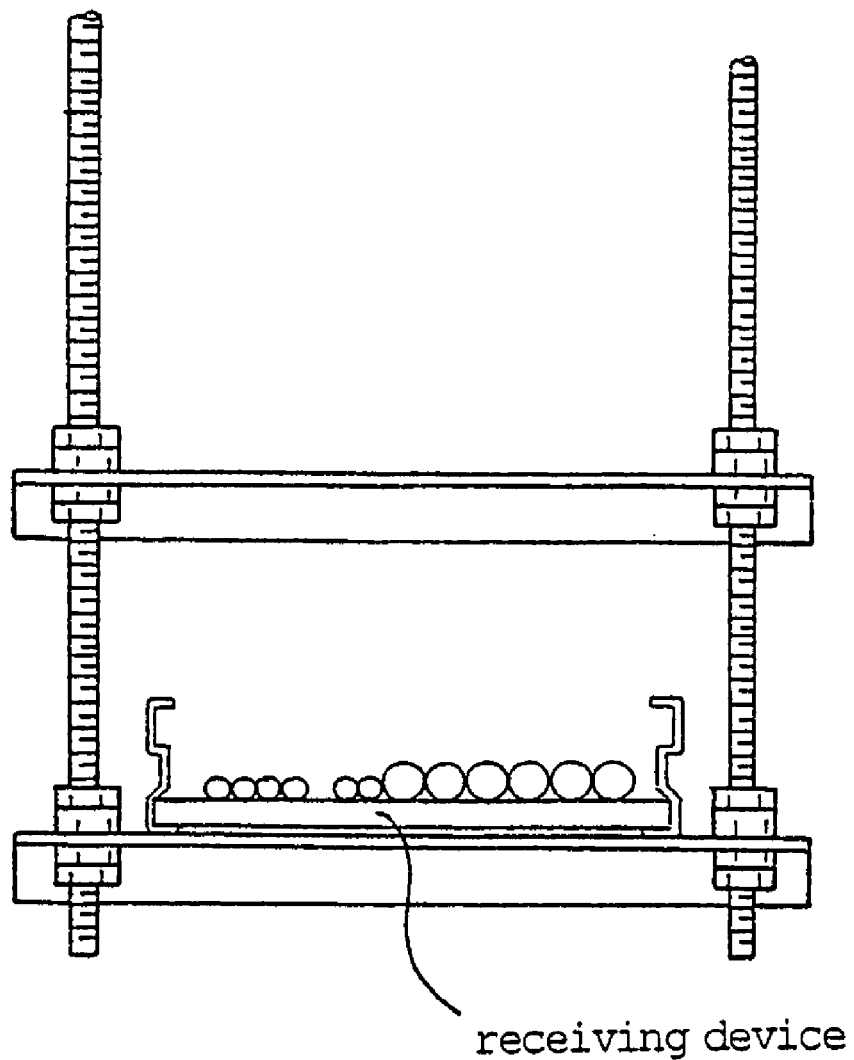
FIG. 43 is a view showing from a front side a state in which the wiring material and piping material receiving device 120 is suspended with respect to the hanging bolt by the intermediate insertion type nut shown in FIG. 41.

FIGS. 39 and 40 show a mounting body 100 of embodiment 11. The mounting body 100 in the present embodiment is structured as a pedestal plate 150 provided with the mounting portion 10. The pedestal plate 150 has an engagement portion 20, an opening portion 70 and adjacent portions 30 in the mounting portion 10 thereof. Since the engagement portion 20, the opening portion 70, the adjacent portions 30 and the engagement projection 21 provided in a protruding manner in the engagement portion 20 in the constituting elements are already described with respect to embodiment 1 to embodiment 7, a description and/or outline thereof is omitted by attaching the same reference numerals to the drawings.

In order to mount the pedestal plate 150 of the present embodiment to the bolt body 300 in accordance with the mounted body, the engagement portion 20 is mounted to the bolt body 300 by applying the engagement portion 20 in accordance with the mounting body 10 to the bolt body 300 from a side portion thereof and plastically deforming the engagement portion 20 as shown in FIGS. 25 and 26.

In the present invention, the structure is not limited to a method of integrally arranging the mounting portion 10 in the plate, and mounting to the bolt body 300 by the mounting portion 10, as shown in FIG. 39, in order to mount the pedestal plate 150 to the bolt body 300. As shown in FIG. 40, the pedestal plate may be structured as a secondary mounting body such that a pair of through holes are pierced in a surface of the plate. The engagement portion 20 of the mounting body 100 (the fixing device) shown in FIG. 3 is inserted into a pair of through holes. Further, the engagement portion 20 is plastically deformed as shown in FIGS. 31 and 32, after the engagement portion 20 is applied to the outer surface of the bolt body 300 from a side portion. At this time, since a portion between the pair of through holes in the pedestal plate in accordance with the secondary mounting body 200 is clamped between the holding portion 50 and the bolt body 300, it is possible to mount the wiring material and piping material box to the bolt body 300.

Further, the mounting portion 10 of the box 130 in accordance with the present embodiment may be structured, as described in embodiments 1 to 4 mentioned above, such that the spirally inscribed surface shaped engagement projection 21 is provided in a protruding manner by arranging the grooves 22 in parallel. The deviation preventing effect is generated by arranging the deviation preventing portion 40 or the like. Alternatively, the engagement portion 20 in the mounting portion 10 is formed as a double structure.

The invention claimed is:

1. A mounting body for mounting to a bolt body having an outer thread from a side portion of the bolt body, the mounting body comprising:

A mounting portion having an engagement portion and an axial opening for receiving the bolt body within the engagement portion;

An inner-thread on an inner face of the engagement portion for engaging the outer thread of the bolt body;

A first adjacent portion operably positioned on the engagement portion and having a first notch on an end thereof, said $1^{st}$ notch oriented parallel to the axial opening;

A second adjacent portion operably positioned on the engagement portion and having a second notch on an end thereof, said $2^{nd}$ notch oriented parallel to the axial opening; and A deviation preventing member having an end and two extending portions separated by a mating slit that receives the first and second adjacent portions such that the first and the second notches matingly receive the end of the deviation preventing member, whereby the deviation preventing member, when attached to the mounting body, causes the adjacent portions and deviation preventing member to be brought into direct contact, thereby affixing the mounting body to the threaded bolt body.

2. The mounting body assembly as claimed in claim 1, wherein the mounting body is deformable so as to close the opening and bring the adjacent portions together.

3. The mounting body assembly as claimed in claim 1, wherein the mounting body assembly includes a receiving device for a wiring material and a piping material.

4. The mounting body assembly as claimed in claim 1, wherein the mounting body assembly includes a box for a wiring material and a piping material.

5. The mounting body assembly as claimed in claim 1, wherein the mounting body assembly includes a hanging metal fitting of a receiving device.

6. The mounting body assembly as claimed in claim 1, wherein the adjacent portions are arranged on first and second sides of the opening carried by the mounting body.

7. The mounting body assembly as claimed in claim 1, wherein the mounting body is temporarily fastened to the bolt body.

8. The mounting body assembly as claimed in claim 1, wherein the engagement portion further comprises a circular arc shape.

9. The mounting body assembly as claimed in claim 1, wherein the adjacent portions comprise tool engaging portions.

10. The mounting body assembly as claimed in claim 1, in which the mounting body mounted to the bolt body may rotate with respect to the bolt body by the engagement of the inner thread of the mounting body with the outer thread of the bolt body, thereby permitting movement along the axial direction of the bolt body.

* * * * *